(12) United States Patent
Bennett et al.

(10) Patent No.: US 10,344,898 B2
(45) Date of Patent: Jul. 9, 2019

(54) PULL-UP BY TORQUE FITTING WITH FEMALE THREADED NUT AND INTEGRAL DYNAMIC WEDGE

(71) Applicant: Swagelok Company, Solon, OH (US)

(72) Inventors: Mark A. Bennett, Bainbridge Township, OH (US); Tobin Berry, Chagrin Falls, OH (US); Mark A. Clason, Orwell, OH (US); John D. Karkosiak, Broadview Heights, OH (US); Thomas A. Lippucci, Seven Hills, OH (US); Andrew P. Marshall, University Heights, OH (US); Jeffrey Michael Rubinski, Novelty, OH (US); Edward A. Stroberg, Willoughby, OH (US); Peter C. Williams, Cleveland Heights, OH (US)

(73) Assignee: SWAGELOK COMPANY, Solon, OH (US)

( * ) Notice: Subject to any disclaimer, the term of this patent is extended or adjusted under 35 U.S.C. 154(b) by 105 days.

(21) Appl. No.: 15/459,084

(22) Filed: Mar. 15, 2017

(65) Prior Publication Data

US 2017/0184227 A1     Jun. 29, 2017

Related U.S. Application Data

(63) Continuation of application No. 14/269,949, filed on May 5, 2014, now Pat. No. 9,611,961, which is a
(Continued)

(51) Int. Cl.
*F16L 19/10* (2006.01)
*F16L 19/065* (2006.01)
(Continued)

(52) U.S. Cl.
CPC .......... *F16L 19/103* (2013.01); *F16L 19/065* (2013.01); *F16L 19/083* (2013.01); *F16L 25/00* (2013.01); *F16L 2201/10* (2013.01)

(58) Field of Classification Search
CPC ......... F16L 19/065; F16L 19/06; F16L 19/08; F16L 19/10
(Continued)

(56) References Cited

U.S. PATENT DOCUMENTS 531,425 A    12/1894  Porteous
1,823,061 A  *  9/1931  Pearson ................. F16L 19/08
                                                   277/607
(Continued)

FOREIGN PATENT DOCUMENTS

CN     101120197    2/2008
DE        645775    6/1937
(Continued)

OTHER PUBLICATIONS

International Search Report from PCT/US07/083416 dated Apr. 21, 2008.
(Continued)

*Primary Examiner* — Aaron M Dunwoody
(74) *Attorney, Agent, or Firm* — Calfee, Halter & Griswold LLP

(57) ABSTRACT

A fitting is provided that may optionally be pulled-up to its final assembled condition by torque rather than by turns. In one embodiment, at least one fitting component includes a structure that facilitates pull-up by torque. The structure may take a wide variety of different forms.

9 Claims, 14 Drawing Sheets

Related U.S. Application Data continuation of application No. 13/770,209, filed on Feb. 19, 2013, now abandoned, which is a continuation of application No. 12/447,936, filed as application No. PCT/US2007/083416 on Nov. 2, 2007, now Pat. No. 8,398,124.

(60) Provisional application No. 60/856,254, filed on Nov. 2, 2006.

(51) Int. Cl.
*F16L 19/08* (2006.01)
*F16L 25/00* (2006.01)

(58) Field of Classification Search
USPC ..... 285/342, 339, 343, 386, 389, 382.7, 354
See application file for complete search history.

(56) References Cited

U.S. PATENT DOCUMENTS

| | | | |
|---|---|---|---|
| 1,894,700 A | 1/1933 | Rue | |
| 2,122,205 A * | 6/1938 | Katzberg | F16L 19/08 |
| | | | 285/385 |
| 2,171,217 A | 8/1939 | Kreidel | |
| 2,354,538 A | 7/1944 | Parker | |
| 2,399,275 A | 4/1946 | Wenk | |
| 2,420,778 A | 5/1947 | Herold | |
| 2,511,134 A | 6/1950 | Stranberg | |
| 2,544,712 A | 3/1951 | Miller | |
| 2,640,716 A * | 6/1953 | Bigelow | F16L 19/10 |
| | | | 285/341 |
| 2,904,355 A | 9/1959 | Creamer | |
| 2,914,344 A * | 11/1959 | Anthes | F16L 19/06 |
| | | | 285/321 |
| 3,006,558 A | 10/1961 | Jacobs | |
| 3,037,796 A | 6/1962 | Lawman | |
| 3,120,969 A | 2/1964 | Schmohl | |
| 3,139,293 A | 6/1964 | Franck | |
| 3,248,136 A | 4/1966 | Brozek et al. | |
| 3,325,192 A | 6/1967 | Sullivan | |
| 3,365,219 A | 1/1968 | Nicolaus | |
| 3,441,297 A | 4/1969 | Koski | |
| 3,445,128 A | 5/1969 | Teeters | |
| 3,521,912 A | 7/1970 | Maurer | |
| 3,582,115 A | 6/1971 | Clague | |
| 3,596,933 A | 8/1971 | Luckenbill | |
| 3,684,322 A | 8/1972 | Kotsakis | |
| 3,695,647 A | 10/1972 | Pugliese | |
| 3,773,169 A | 11/1973 | Zahuranec et al. | |
| 3,848,905 A | 11/1974 | Hammer et al. | |
| 3,972,112 A | 8/1976 | O'Sickey et al. | |
| 4,136,897 A | 1/1979 | Haluch | |
| 4,162,802 A * | 7/1979 | Cox | F16L 19/10 |
| | | | 285/343 |
| 4,286,807 A | 9/1981 | Bachli | |
| 4,309,050 A | 1/1982 | Legris | |
| 4,437,691 A | 3/1984 | Laney | |
| 4,475,748 A | 10/1984 | Ekman | |
| 4,529,231 A | 7/1985 | Greenawalt | |
| 4,538,842 A | 9/1985 | Kowal et al. | |
| 4,568,114 A | 2/1986 | Konrad | |
| 4,613,158 A * | 9/1986 | Ekman | F16L 37/0925 |
| | | | 285/249 |
| 4,799,717 A | 1/1989 | Kingsford | |
| 4,877,271 A | 10/1989 | McCorkle | |
| 4,900,068 A | 2/1990 | Law | |
| 4,915,136 A | 4/1990 | Bartholomew | |
| 4,919,455 A | 4/1990 | Yoshiro | |
| 5,074,599 A * | 12/1991 | Wirbel | F16L 47/04 |
| | | | 285/341 |
| 5,090,738 A | 2/1992 | Rakieski | |
| 5,186,501 A | 2/1993 | Mano | |
| 5,280,967 A | 1/1994 | Varrin, Jr. | |
| 5,351,998 A | 10/1994 | Behrens et al. | |
| 5,429,394 A | 7/1995 | Olson | |
| 5,472,016 A | 12/1995 | Szabo | |
| 5,536,049 A | 7/1996 | Coules | |
| 5,622,393 A | 4/1997 | Elbich et al. | |
| 5,796,898 A | 8/1998 | Lee | |
| 5,882,050 A | 3/1999 | Williams et al. | |
| 5,921,588 A | 7/1999 | Vogel et al. | |
| 6,073,976 A | 6/2000 | Schmidt et al. | |
| 6,131,963 A | 10/2000 | Williams et al. | |
| 6,279,242 B1 | 8/2001 | Williams et al. | |
| 6,345,845 B2 | 2/2002 | Johnston | |
| 6,378,908 B1 | 4/2002 | Walker | |
| 6,499,511 B2 | 12/2002 | Brewis | |
| 6,517,115 B1 | 2/2003 | Bilvet | |
| 6,629,708 B2 | 10/2003 | Williams et al. | |
| 6,640,457 B2 | 11/2003 | Williams et al. | |
| 6,641,180 B2 | 11/2003 | Udhoefer | |
| 6,757,950 B2 | 7/2004 | Malone | |
| 6,851,729 B2 | 2/2005 | Gibson | |
| 6,860,514 B2 | 3/2005 | Wentworth et al. | |
| 7,002,077 B2 | 2/2006 | Pyron | |
| 7,032,932 B2 | 4/2006 | Guest | |
| 7,066,496 B2 | 6/2006 | Williams et al. | |
| 7,108,288 B2 | 9/2006 | Bennett et al. | |
| 7,194,817 B2 | 3/2007 | Williams | |
| 7,240,925 B2 | 7/2007 | Fukano | |
| 7,267,374 B2 | 9/2007 | Nielson | |
| 7,393,018 B2 | 7/2008 | Williams et al. | |
| 7,416,225 B2 | 8/2008 | Williams | |
| 7,497,483 B2 | 3/2009 | Williams et al. | |
| 7,549,677 B2 | 6/2009 | Feger | |
| 7,690,696 B2 | 4/2010 | Mallis et al. | |
| 7,695,027 B2 | 4/2010 | Williams et al. | |
| 8,398,124 B2 | 3/2013 | Bennett | |
| 8,608,210 B2 | 12/2013 | Kainec | |
| 8,678,444 B2 | 3/2014 | LeQuere | |
| 8,960,728 B2 | 2/2015 | Williams | |
| 9,528,640 B2 | 12/2016 | Yoon | |
| 9,611,961 B2 | 4/2017 | Bennett | |
| 2002/0148128 A1 * | 10/2002 | Williams | F16L 19/00 |
| | | | 33/501.45 |
| 2004/0212192 A1 | 10/2004 | Williams et al. | |
| 2005/0097763 A1 | 5/2005 | Williams et al. | |
| 2005/0242582 A1 | 11/2005 | Williams et al. | |
| 2005/0264005 A1 * | 12/2005 | Norman | F16L 19/0206 |
| | | | 285/249 |
| 2006/0237962 A1 | 10/2006 | Anderson et al. | |
| 2007/0170723 A1 * | 7/2007 | Asakawa | F16L 19/10 |
| | | | 285/354 |
| 2008/0054626 A1 | 3/2008 | Bearer et al. | |
| 2008/0246278 A1 * | 10/2008 | Williams | F16L 19/10 |
| | | | 285/382.7 |
| 2009/0127803 A1 * | 5/2009 | Chelchowski | F16L 19/065 |
| | | | 277/622 |
| 2009/0289452 A1 * | 11/2009 | Bennett | F16L 19/065 |
| | | | 285/339 |
| 2010/0171309 A1 * | 7/2010 | Kainec | F16L 19/00 |
| | | | 285/382 |
| 2010/0213705 A1 | 8/2010 | Williams et al. | |
| 2010/0219631 A1 | 9/2010 | Williams et al. | |
| 2011/0277309 A1 | 11/2011 | Bearer et al. | |
| 2012/0005878 A1 * | 1/2012 | Rubinski | F16L 19/103 |
| | | | 29/525.11 |
| 2012/0043757 A1 * | 2/2012 | Williams | F16L 19/103 |
| | | | 285/339 |
| 2015/0362101 A1 | 12/2015 | Bearer | |
| 2016/0169425 A1 | 6/2016 | Williams | |
| 2017/0089497 A1 | 3/2017 | Williams et al. | |

FOREIGN PATENT DOCUMENTS

| | | |
|---|---|---|
| DE | 1775542 | 7/1971 |
| DE | 2145760 | 3/1973 |
| DE | 4041679 | 6/1992 |
| DE | 19607784 | 10/1996 |
| DE | 19736765 | 2/1999 |
| DE | 10102684 | 8/2003 |
| DE | 10206684 | 8/2003 |

(56) References Cited

FOREIGN PATENT DOCUMENTS

| | | |
|---|---|---|
| DK | 112060 | 11/1968 |
| EP | 863354 | 9/1998 |
| EP | 286568 | 12/1998 |
| EP | 899498 | 3/1999 |
| EP | 1020675 | 7/2000 |
| EP | 1271038 | 1/2003 |
| EP | 1612467 | 1/2006 |
| GB | 384700 | 12/1932 |
| GB | 981709 | 1/1965 |
| GB | 2165899 | 4/1986 |
| JP | 7-243564 | 9/1995 |
| KR | 1998-072685 | 11/1998 |
| WO | 93/025837 | 12/1993 |
| WO | 05/019717 | 3/2005 |
| WO | 05/106310 | 11/2005 |
| WO | 07/002576 | 1/2007 |
| WO | 08/057983 | 5/2008 |
| WO | 09/020900 | 2/2009 |
| WO | 11/099667 | 8/2011 |

OTHER PUBLICATIONS

International Search Report from PCT/US08/072072 dated Jan. 28, 2009.
International Search Report and Written Opinion from PCT/US10/24770 dated May 17, 2010.
International Search Report and Written Opinion from PCT/US11/43158 dated Dec. 13, 2011.
Search Report from European Application No. 12161443.2 dated May 21, 2012.
Office action from Korean Application No. 10-2008-7020649 dated Nov. 14, 2008.
One page drawing dated Apr. 28, 2009—Standard 800 Series Space Collar Assy., (illustrated collar and fitting assembly offered for sale at least as early as Feb. 5, 2000) Swagelok Company.
International Search Report and Written Opinion from PCT/US10/024767 dated Apr. 9, 2010.
Search Report from European Application No. 12161444 dated Apr. 27, 2012.
Search Report from European Application No. 12161445 dated Apr. 27, 2012.
Communication from European Application No. 12161443.2 dated Nov. 30, 2015.
Office action from U.S. Appl. No. 15/053,197 dated Jan. 20, 2017.
Search Report and Written Opinion from European Application No. 10744371.5 dated Jul. 10, 2014.
Office action from Canadian Application No. 2,860,068 dated Jun. 23, 2017.
Notice of Allowance from U.S. Appl. No. 15/053,197 dated Aug. 24, 2017.
Notice of Allowance from U.S. Appl. No. 15/053,197 dated May 1, 2017.
Advisory Action from U.S. Appl. No. 15/053,197 dated Mar. 17, 2017.
Office action from U.S. Appl. No. 15/053,197 dated Jun. 29, 2016.
Office action from Korean Application No. 10-2016-7029725 dated Feb. 15, 2017.
Office action from European Application No. 10744371.5 dated Jun. 8, 2017.
Office action from Chinese Application No. 201510537977.1 dated May 27, 2017.
Office action from U.S. Appl. No. 14/662,391 dated Jul. 20, 2017.
Office action from European Application No. 10744371.5 dated Oct. 28, 2016.
Office action from Chinese Application No. 201510537977.1 dated Sep. 30, 2016.
Office action from Chinese Application No. 201510537968.2 dated Nov. 16, 2016.
Office action from Indian Application No. 6665/CHENP/2011 dated May 3, 2018.

* cited by examiner

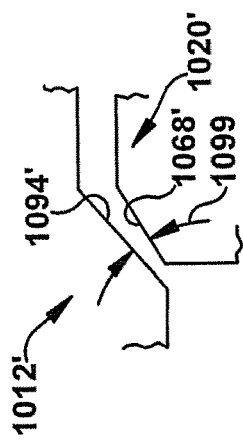
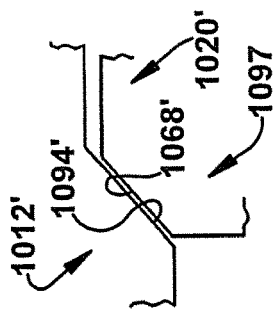
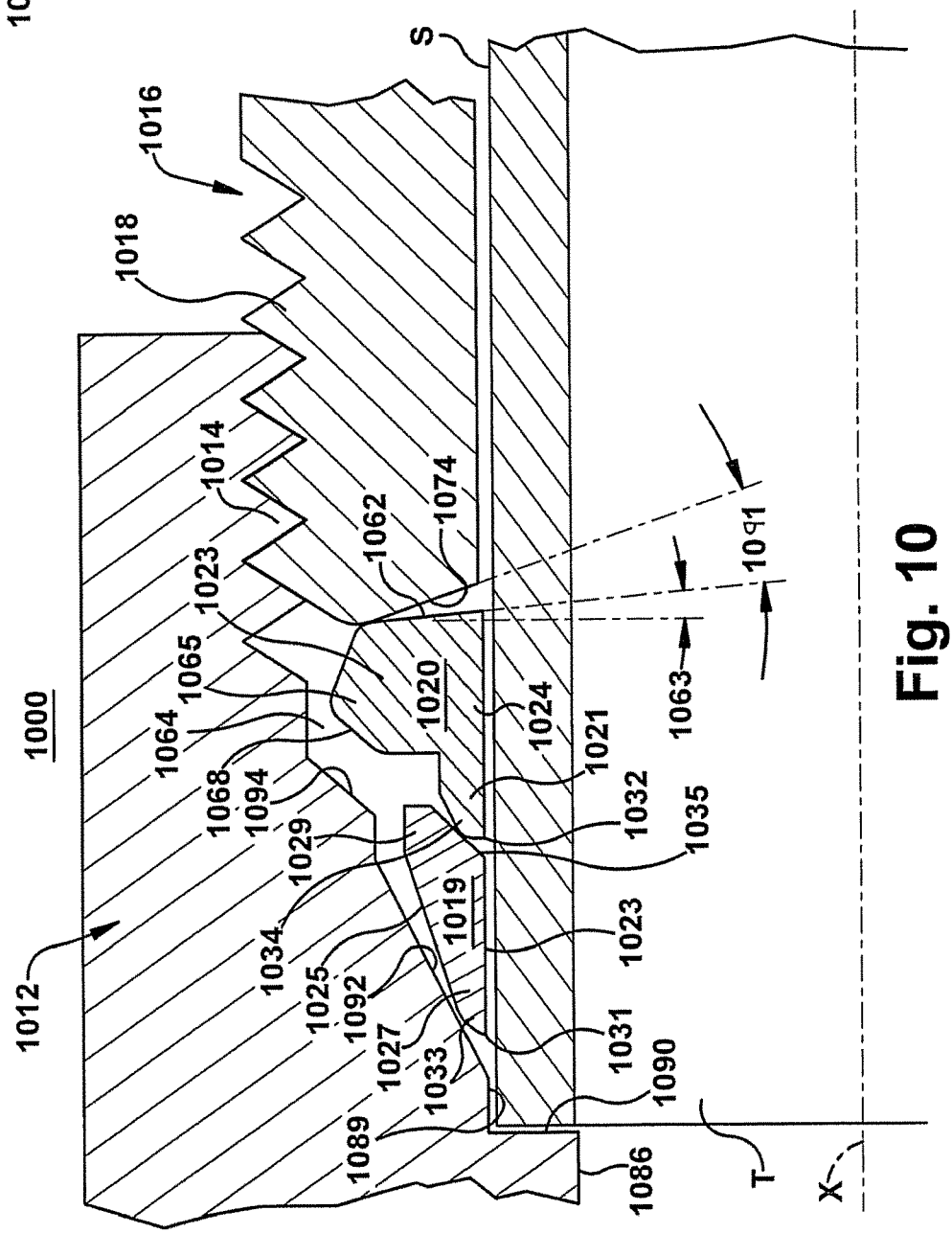

PULL-UP BY TORQUE FITTING WITH FEMALE THREADED NUT AND INTEGRAL DYNAMIC WEDGE

CROSS REFERENCE TO RELATED APPLICATIONS

This application is a continuation application of U.S. Ser. No. 14/269,949, filed May 5, 2014, titled "Pull-up By Torque Fitting with Female Threaded Nut and Integral Dynamic Wedge" which is a continuation application of U.S. Ser. No. 13/770,209, filed Feb. 19, 2013, entitled "Pull-up By Torque Fitting with Female Threaded Nut and Integral Dynamic Wedge", now abandoned, which is a continuation application of U.S. Ser. No. 12/447,936, filed Apr. 30, 2009, entitled "Pull-Up By Torque Fitting", now U.S. Pat. No. 8,398,124, issued Mar. 19, 2013, which is the U.S. national phase entry of PCT/US2007/083416, with an international filing date of Nov. 2, 2007, entitled "Pull-Up By Torque Fitting", which claims the benefit of U.S. provisional patent application Ser. No. 60/856,254, entitled "Pull-up By Torque Ferrule Fitting," filed on Nov. 2, 2006, all of which are incorporated herein by reference in their entirety.

BACKGROUND OF THE INVENTION

Flareless fittings have been in use for decades for conduits such as tubes and pipes. A flareless fitting is used to connect or join two tube or pipe ends or to connect a conduit end to another assembly such as a tank, a valve, a manifold and so on. The applications are as varied as the types of assemblies with which the fittings are used. One very common type of flareless fitting is a ferrule type fitting. In a ferrule type fitting, one or more ferrules are used to join or connect a conduit end to a fitting member, typically called a fitting body. The fitting body may then be joined to (or be part of) another assembly. In a ferrule type fitting, the ferrule or ferrules must establish a fluid tight seal, particularly under pressure, as well as adequate grip of the conduit and protection against vibration fatigue. High performance fittings, such as are available from Swagelok Company, Solon, Ohio, are capable of withstanding pressures many times the rated pressure of the fitting without leaking, without vibration fatigue and without conduit blow out to the point that the conduit will burst before a seal is compromised or the ferrules can lose their grip on the conduit.

Ferrule style fittings have an advantage over other end connections in that they do not rely on any special preparation of the conduit end, other than low cost squaring and deburring. This is because the ferrules create the seals and conduit grip.

Lower cost markets, such as the automotive industry, have their own performance requirements for fluid connections. Most notably, automotive assembly requires simpler assembly procedures. The automotive industry has resisted using ferrule type fittings not only for cost reasons, but also for assembly needs. Typical ferrule type fittings are assembled by what is commonly known as pull-up by turns. Two threaded components, such as a nut and body, enclose the conduit end and one or more ferrules. The assembly is first tightened to a finger tight condition and then a prescribed number of turns, such as one and a quarter or one and a half turns, are used to pull-up the fitting to its final assembled condition. The number of turns is carefully prescribed to prevent over torque or inadequate pull-up. The automotive industry on the other hand typically wants to assemble parts by torque. This allows a simple torque wrench or tool to be used to make the final assembly with the assurance that the final assembly has been properly assembled.

SUMMARY OF THE DISCLOSURE

In accordance with an inventive aspect of the disclosure, a fitting is provided that may optionally be pulled-up to its final assembled condition by torque rather than by turns. In one embodiment, at least one fitting component includes a structure that facilitates pull-up by torque. The structure may take a wide variety of different forms. Examples of fitting component structures that facilitate pull-up by torque include, but are not limited to, an inclined or wedge surface defined by at least one of the fitting components, a ring that engages first and second fitting components, and fitting component threads that are configured to increase the torque required to further tighten the fitting components when the fitting is properly pulled up.

BRIEF DESCRIPTION OF THE DRAWINGS

These and other inventive aspects and features of the present disclosure will become apparent to one skilled in the art to which the present invention relates upon consideration of the following description of the exemplary embodiments with reference to the accompanying drawings, in which:

FIG. 10 is a longitudinal cross-section of an exemplary embodiment of a fitting with a rear ferrule and a fitting body that are configured to facilitate pull-up by torque;

FIG. 10A illustrates a fitting embodiment similar to the embodiment illustrated by FIG. 10 where a difference angle is formed between a ferrule flange and a fitting body camming surface when the fitting is in a finger-tight condition;

FIG. 10B illustrates the fitting embodiment of FIG. 10A in a pulled-up condition;

DETAILED DESCRIPTION OF THE INVENTION

Figure 1A:
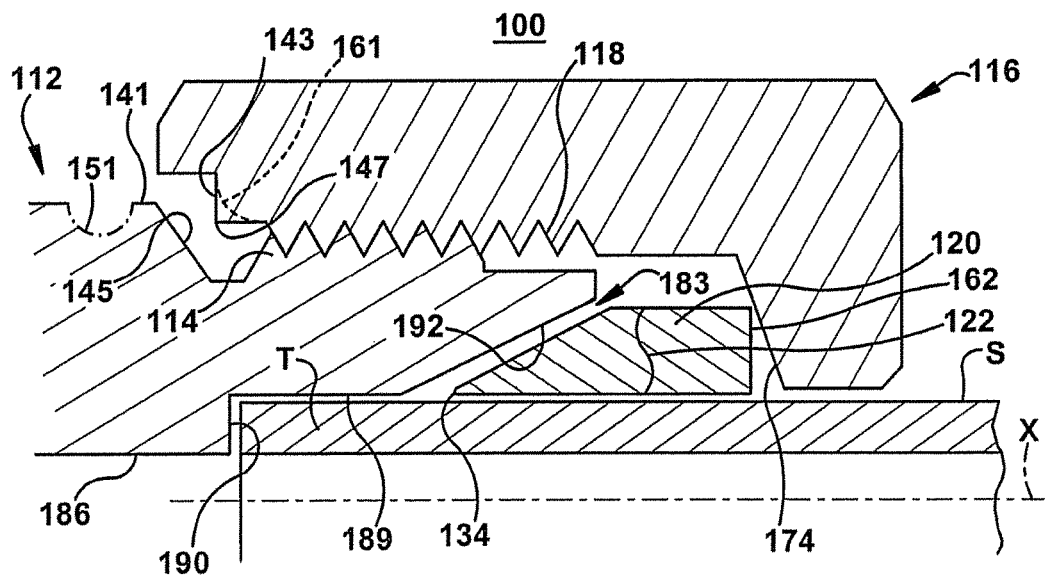
FIG. 1A is a longitudinal cross-section of an exemplary embodiment of a fitting with a fitting body having an inclined surface that facilitates pull-up by torque.

While the inventions are described herein with specific reference to a variety of structural and material features, such descriptions are intended to be exemplary in nature and should not be construed in a limiting sense. For example, the exemplary embodiments are described primarily in terms of a stainless steel conduit fitting for automotive applications. Those skilled in the art, however, will readily appreciate that any one or more of the aspects and features of the invention may be used outside of the automotive industry, may be used with materials other than stainless steel and may be used with many conduits including, but not limited to, tube or pipe. Moreover, many of the aspects of the invention may be used for lower pressure fittings, or the higher rated pressure concepts disclosed herein may be used in a fitting even when the fitting itself will be used in a lower pressure application.

Still further, many of the exemplary embodiments herein illustrate what is commonly known as a female-style fitting, meaning that a female (i.e. internally) threaded component receives and abuts the conduit end. Many aspects of the female-style embodiments will find application in male-style fittings as will be apparent to those skilled in the art. Similarly, many of the exemplary embodiments herein illustrate male-style fittings. Many aspects of the male-style embodiments will find application in female-style fittings as will be apparent to those skilled in the art. The invention will also find application for fitting assemblies that do not require threaded connections between the fitting components, for example clamped or bolted fittings may be used. The invention will also find application far beyond the exemplary embodiments herein as to connections that may be made to a wide and ever expansive variety of fluid components including, but not limited to, other conduits, flow control devices, containers, manifolds and so on.

While various aspects of the invention are described and illustrated herein as embodied in combination in the exemplary embodiments, these various aspects may be realized in many alternative embodiments, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices, and so on may be described herein, such descriptions are not intended to be a complete or exhaustive list of available alternative embodiments, whether presently known or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, exemplary or representative values and ranges may be included to assist in understanding the present invention however, such values and ranges are not to be construed in a limiting sense and are intended to be critical values or ranges only if so expressly stated.

Although the various embodiments are described herein with specific reference to the fitting components being made of stainless steel, such description is intended to be exemplary in nature and should not be construed in a limiting sense. Those skilled in the art will readily appreciate that the invention may be realized using any number of different types of metals material for the fitting components, as well as metal conduit materials, including but not limited to 316, 316L, 304, 304L, any austenitic or ferritic stainless steel, any duplex stainless steel, any nickel alloy such as HASTALLOY, INCONEL, MONEL, alloy 825, alloy 625, any precipitation hardened stainless steel such as 17-4PH for example, brass, copper alloys, any carbon or low allow steel such as 12L14 steel for example. A conduit gripping device may be case or through hardened to a ratio of at least 3.3 and preferably 4 or more times harder than the hardest conduit material that the fitting will be used with. Therefore, the conduit gripping device need not be made of the same material as the conduit itself. For example, the conduit gripping device may be selected from the stainless steel material noted above, or other suitable materials that may be case hardened, such as magnesium, titanium and aluminum, to name some additional examples.

The present application discloses several embodiments of flareless fittings with conduit gripping devices, such as, for example, one or more ferrules, that may optionally be pulled-up to their final assembled condition by torque rather than by turns. The fittings include structure that facilitates pull-up by torque. As illustrated by the exemplary embodiments described below, the structure may take a wide variety of different forms. Any structure that provides a sharp torque rise when the fitting is properly pulled up may be employed. In an exemplary embodiment, the structure allows the fitting to be disassembled and remade with a successful reseal. The structure may be configured to allow the fitting to be disassembled and remade multiple times with a successful reseal each time the fitting is remade. The structure facilitates repeated remake by permitting additional stroke of the fitting components to further advance the ferrule, even if only slightly, each time the fitting is remade. The structure may be configured to allow the fitting to be remade with the same initial pull-up torque or the structure may cause the torque required for remakes to be greater than the initial pull-up torque. One example of a fitting component structure that facilitates pull-up by torque and permits additional stroke is an inclined or wedge surface defined by at least one fitting component. Several exemplary embodiments of fittings that may be pulled up by torque and may be disassembled and remade are described below.

The Figures that illustrate some of the fitting embodiments disclosed herein schematically illustrate the conduit gripping device. These Figures show the fitting embodiments in a finger tight. A description of examples of how fittings are pulled up and figures showing examples of conduit gripping devices in finger tight and pulled-up conditions can be found in United States Patent Application Publication No.: 2005/0242582, which is incorporated herein by reference in its entirety.

FIGS. 1A-1D illustrate embodiments of fittings 100 with fitting components that include inclined or wedge surfaces that facilitate pull-up by torque. The fittings 100 include a first fitting component 112 that may be realized in the Balm of a male threaded body having external threads 114. The first fitting component 112 joins or connects with a second fitting component 116 that may be realized in the form of a female threaded nut having internal threads 118 that threadably mate with the threads 114 of the first component 112 when the fittings 100 are made-up or assembled. Different thread options and non-threaded coupling designs may be used for the first and second fitting components.

The fittings 100 further include a conduit gripping device 120. In this application, the term conduit gripping device means any device that grips and/or seals against a conduit, such as a tube or a pipe. Typically the conduit gripping device comprises one or two components. For example, the conduit gripping device may comprise one ferrule, two ferrules or more than two ferrules. A conduit gripping device 120 is schematically illustrated in FIGS. 1A-1D. The line 122 on the schematic illustration of a conduit gripping device 120 indicates that the conduit gripping device 120 may comprise a single ferrule, there may be two ferrules, or alternative gripping device(s) may be used. A wide variety of conduit gripping devices 120 may be used. Any conduit gripping device that grips and seals with a conduit end T may be used. Examples of conduit gripping devices that may be used include, but are not limited to, the conduit gripping devices described in U.S. Pat. No. 5,882,050 issued on Mar. 16, 1999; U.S. Pat. No. 6,131,963 issued on Oct. 17, 2000; and U.S. Patent Application Publication No. 2005/0242582 published on Nov. 3, 2005; which are incorporated herein by reference in their entirety. The nut 116 and conduit gripping device 120 fit onto a conduit end T that is received by the body 112. In this application, the term "conduit" encompasses all types of fluid conduits, including but not limited to tube and pipe.

The female nut 116 has a drive surface 174 that contacts a driven surface 162 of the conduit gripping device 120 during pull-up. The male threaded body 112 is a generally cylindrical part centered on the axis X. The body 112 has an opening 183 at a forward end adapted to receive the conduit end T. A central bore 186 extends through the body 112 and defines a fluid flow path. The central bore 186 may be in communication with another part such as a valve, tee, elbow, manifold, etc. It should be noted that although the male threaded fitting component 112 is shown as a separate stand alone part, the features of the component by which it may make a fluid connection with the male threaded fitting component could, alternatively, be incorporated into a bulk body such as a manifold, valve, pump, tank, and so on, commonly referred to as a fluid port.

The male body further includes a counterbore 189 that forms a shoulder 190. The conduit end T bottoms against the shoulder 190 when received by the body 112. The counterbore 189 may have a slight taper to it to help form a seal about the conduit end T upon pull-up of the fitting 10.

The male fitting component 112 further includes a tapered surface, such as for example frusto-conical surface 192. The frusto-conical surface 192 forms a ferrule camming surface in the body 112 and may be axially adjacent the forward end of the counterbore 189. The ferrule camming surface is formed at an angle that may be selected to optimize the camming action with a nose portion 134 of the conduit gripping device 120. In typical two ferrule and one ferrule fittings, this angle is about twenty degrees but may be any suitable value from about ten degrees to about forty-five degrees.

The male threads 114 of the body 112 which threadably mate with the threads 118 on the female nut 116. The body 112 may be provided with hex flats to facilitate holding the body while the nut 116 is being tightened down during pull-up. Of course, pull-up involves relative axial translation between the fitting components, the nut 116 and body 112, in this case effected by relative rotation between the nut and body, regardless of which fitting component is being held and which is being turned. In a non-threaded coupling, pull-up involves relative axial translation between the two fitting components by means other than two threaded components, such as for example two components forced together by a clamping device.

The body 112 (See FIG. 1A-1C) or the nut 116 (See FIG. 1D) may include a marking 151 or structure that may be used to provide an intrinsic gauging function to verify proper pull-up for both pull-up by torque and pull-up by turns. By intrinsic gauging is meant a structure or feature associated with the fitting itself (as contrasted with a separate tool or gauge) that provides an indication to the assembler that the fitting has been properly assembled and pulled up. A large variety of structures or features may perform the intrinsic gauging function, some examples of which are disclosed in International Application No. 03/07739, U.S. patent application Ser. No. 10/711,353, and U.S. Pat. No. 6,640,457 B2, the entire disclosures of which are fully incorporated herein by reference. A gap gauge may also be used in a known manner to confirm proper pull-up of the fitting 100.

The conduit gripping component nose portion 134 is positioned at least partially within the camming mouth formed by the ferrule camming surface 192. The driven surface 162 of a conduit gripping device engages the drive surface 174 of the nut 116. When the fitting is pulled up, the conduit gripping device 120 bites or indents into the conduit surface S, producing a strong conduit grip and a fluid tight seal.

In the examples illustrated by FIGS. 1A-1D, the fitting body 112 and/or the nut includes an inclined surface that causes the amount of torque required to continue pulling-up the fitting to sharply increase. The inclined surface may be formed on an external surface 141 of the male threaded body or an outer portion 143 of the nut that is radially outward of the female threads 118 of the nut 116. The inclined surface may take a wide variety of different forms.

In the embodiment illustrated by FIG. 1A, an inclined surface 145 is defined on the external surface 141 of the male threaded body and an engagement surface 147 is disposed on the outer portion 143 of the nut. When the fitting 100 is pulled-up the engagement surface 147 engages the inclined surface 145 and causes the amount of torque required to continue pulling up the fitting to sharply increase. The engagement surface 147 may take a wide variety of different forms. For example, the engagement surface 147 may have an edge as illustrated by solid lines or the engagement surface 147 may be rounded as indicated by dashed lines 161 in FIG. 1A. The engagement surface 147 may take any form that causes the amount of torque required to continue pulling up the fitting to sharply increase when the engagement surface 147 engages the inclined surface 145. A rounded surface may take a wide variety of different forms. A rounded surface may have a single radius, multiple blended radii, and/or straight portions and curved portions. The rounded portion may have be any structure that has at least one curved portion.

Figure 1B:
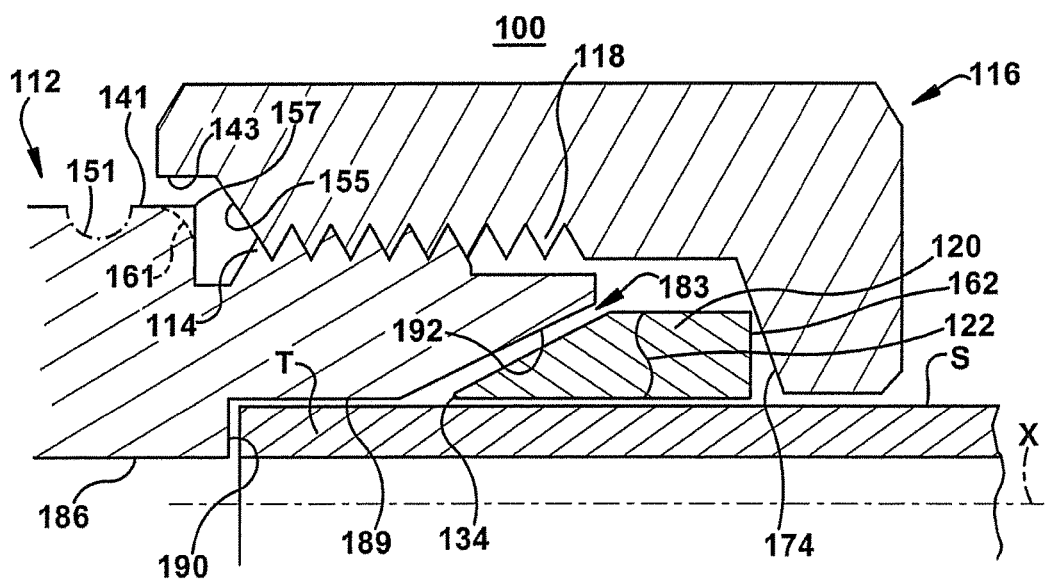
FIG. 1B is a longitudinal cross-section of an exemplary embodiment of a fitting with a nut having an inclined surface that facilitates pull-up by torque.

In the embodiment illustrated by FIG. 1B, an inclined surface 155 is defined on the outer portion 143 of the nut and an engagement surface 157 is disposed on the external surface 141 of the male threaded body. When the fitting 100 is pulled-up the engagement surface 157 engages the inclined surface 155 and causes the amount of torque required to continue pulling up the fitting to sharply increase. The engagement surface 157 may take a wide variety of different forms. For example, the engagement surface 157 may have an edge as illustrated by solid lines or the engagement surface 157 may be rounded as indicated by dashed lines 161 in FIG. 1B.

Figure 1C:
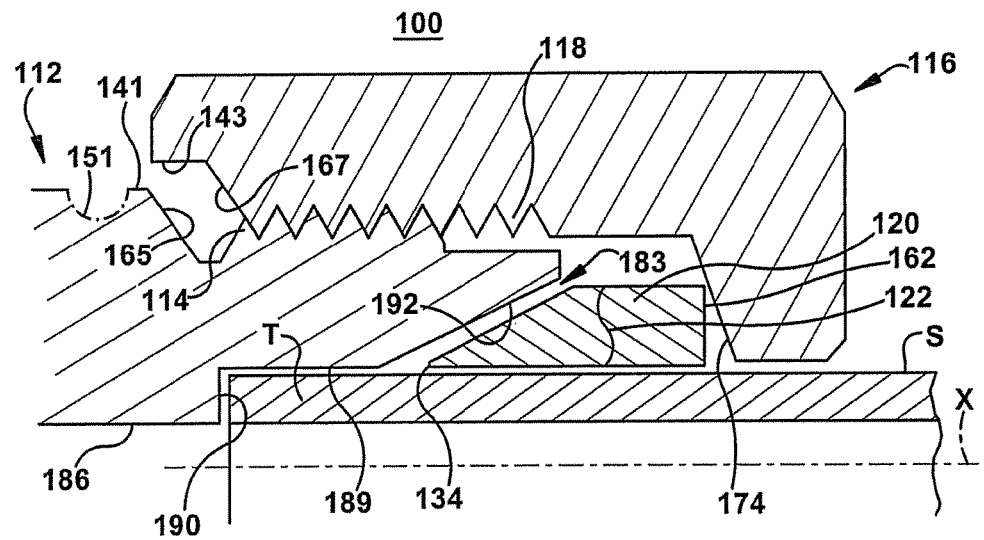
FIG. 1C is a longitudinal cross-section of an exemplary embodiment of a fitting with a fitting body having an inclined surface and a fitting nut having an inclined surface that facilitate pull-up by torque.

In the embodiment illustrated by FIG. 1C, a first inclined surface 165 is defined on the external surface 141 of the male threaded body and a second inclined surface 167 is disposed on the outer portion 143 of the nut. When the fitting 100 is pulled-up the inclined surfaces 165, 167 engage one another and cause the amount of torque required to continue pulling up the fitting to sharply increase.

Figure 1D:
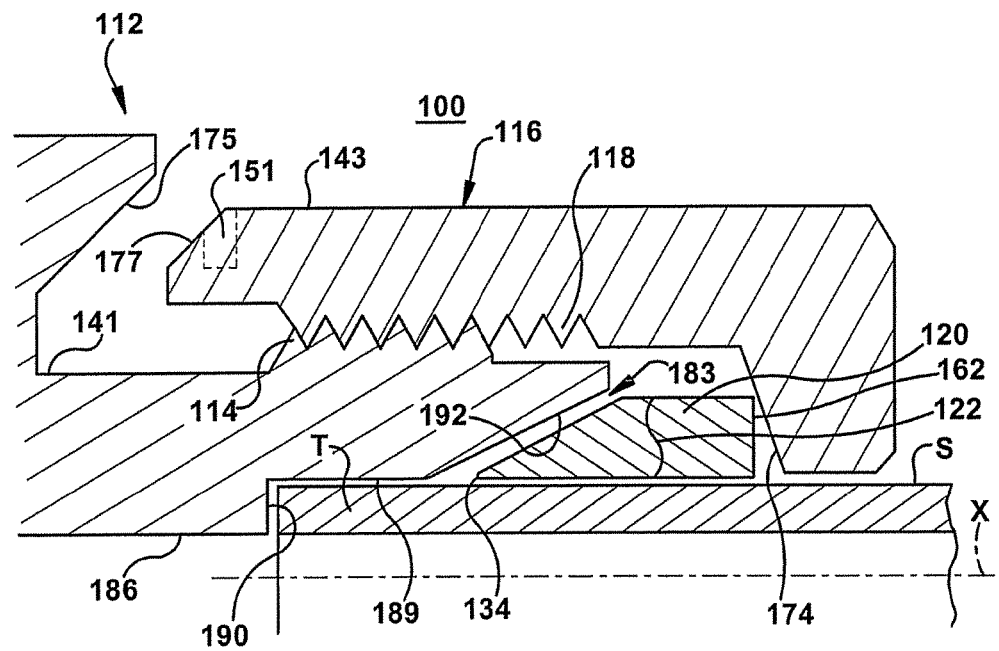
FIG. 1D is a longitudinal cross-section of an exemplary embodiment of a fitting with a fitting body having an inclined surface and a fitting nut having an inclined surface that facilitate pull-up by torque.

In the embodiment illustrated by FIG. 1D, a first inclined surface 175 is defined on the external surface 141 of the male threaded body and a second inclined surface 177 is disposed on the outer portion 143 of the nut. When the fitting 100 is pulled-up the inclined surfaces 175, 177 engage one another and cause the amount of torque required to continue pulling up the fitting to sharply increase. The inclined surfaces 175, 177 are configured to force the nut 116 radially inward as the fitting is pulled up. The first inclined surface 175 and/or the second inclined surface 177 may be replaced with an engagement surface, such as a surface with an edge that is not tapered or a rounded surface.

Angling the inclined surface or surfaces such that the inclined surface or surfaces form an angle of less than ninety degrees with respect to the central axis, for example an angle of between thirty degrees to sixty degrees with respect to the central axis X allows the fitting to be remade. Each remake of the fitting 100 progresses the fitting body 112 further into the nut 116 for each re-make, even if only slightly. In one embodiment, the angle of the inclined surface or surfaces is selected such that the torque required to remake the fitting is the same as the initial pull-up torque. In one example, the inclined surface or surfaces are angled at approximately 45 degrees with respect to the central axis X and the torque required to initially pull-up the fitting and the torque required to remake the fitting are approximately the same. However, many properties of the fitting components affect the torque required to initially pull-up the fitting and the torque required to remake the fitting. As such, the angle or range of angles of the inclined surface or surfaces with respect to the central axis X that allow the fitting to be remade and properly seal by applying the same torque as the initial pull-up torque will vary, depending on the properties of the fitting components. For very sharp torque increases, the angle between the inclined surface or surfaces and the central axis X may approach ninety degrees. This alternative arrangement would provide a dramatic increase in torque for pull-up by torque, but in some cases may lessen the ability to remake the fitting 100 after the initial pull-up.

Figure 2A:
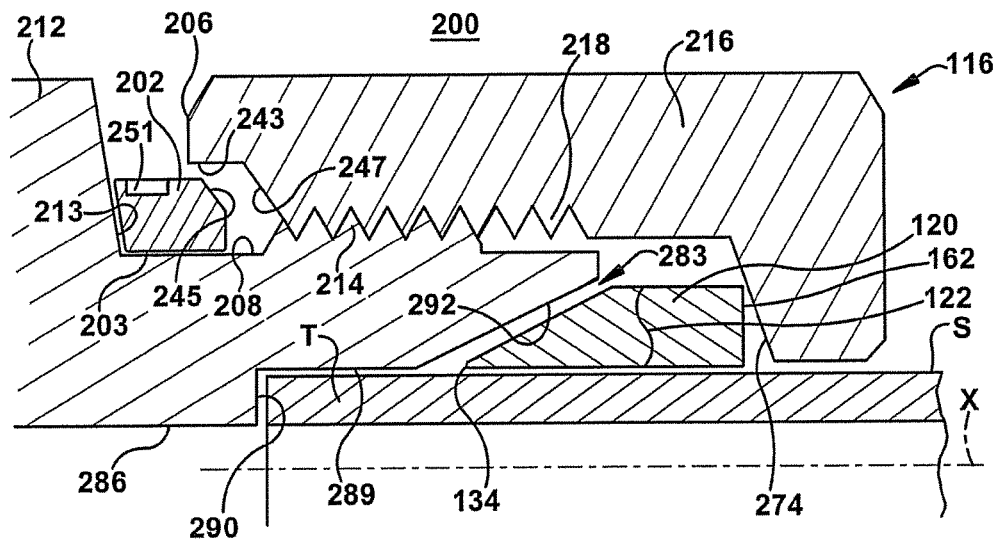
FIG. 2A is a longitudinal cross-section of an exemplary embodiment of a fitting with an external ring that facilitates pull-up by torque.
Figure 2B:
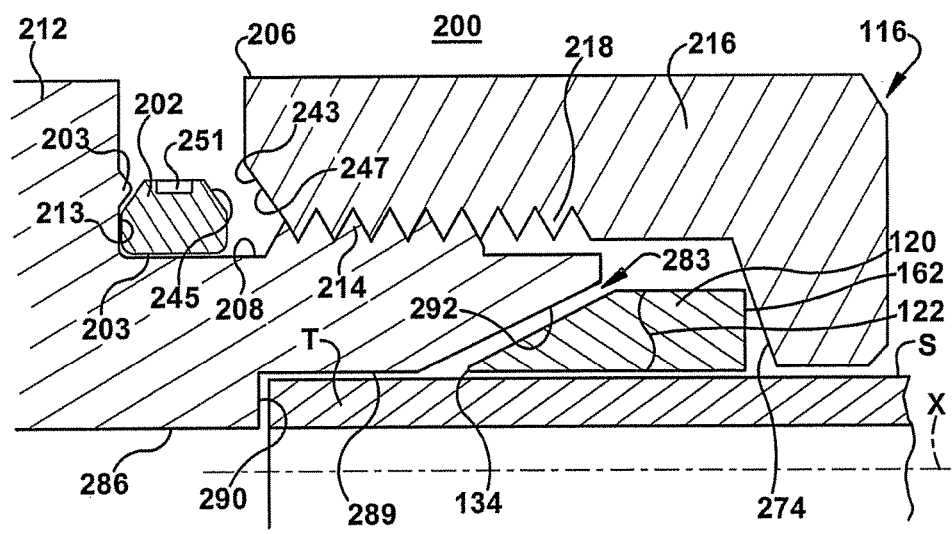
FIG. 2B is a longitudinal cross-section of an exemplary embodiment of a fitting with an external ring that facilitates pull-up by torque.

FIGS. 2A and 2B illustrate embodiments of fittings 200 that include an external ring 202 that facilitates pull-up by torque. In one embodiment, the external rings 202 are configured to convert existing fittings that may be pulled up only by turns to fittings that may be pulled up by turns and may optionally be pulled up by torque. The fittings 200 include a first fitting component 212 that may be realized in the form of a male threaded body having external threads 214 and a second fitting component 216 that may be realized in the form of a female threaded nut having internal threads 218. Different thread options and non-threaded coupling designs may be used for the first and second fitting components. The fittings 200 include a conduit gripping device 120. The nut 216 and conduit gripping device 120 fit onto a conduit end T that is received by the body 212. The embodiments of FIGS. 2A and 2B are substantially similar. The embodiment illustrated by FIG. 2B includes a locating protrusion 203 that helps to align the ring 202 on the fitting body.

The female nut 216 has a drive surface 274 that contacts a driven surface 162 of the conduit gripping device 120 during pull-up. The male threaded body 212 is a generally cylindrical part centered on the axis X. The body 212 has an opening 283 at a forward end adapted to receive the conduit end T. A central bore 286 extends through the body 212. The male body further includes a counterbore 289 that forms a shoulder 290. The conduit end T bottoms against the shoulder 290 when received by the body 112.

The male fitting component 212 further includes a tapered surface, such as for example frusto-conical surface 292. The frusto-conical surface 292 forms a ferrule camming surface in the body 212 and may be axially adjacent the forward end of the counterbore 289. The first or ferrule camming surface is formed at an angle that may be selected to optimize the camming action with the nose portion 134 of the conduit gripping device 120. In typical two ferrule and one ferrule fittings, this angle is about twenty degrees but may be any suitable value from about ten degrees to about sixty degrees.

The body 212, the nut 216, and/or the ring 202 may include a marking 251 that may be used to provide an intrinsic gauging function to verify proper pull-up for both pull-up by torque and pull-up by turns. In the example illustrated by FIGS. 2A and 2B, the marking 251 comprises a slot or band around the ring 202. When the fitting 200 is properly pulled-up, all or a portion of the band 204 is covered by an edge 206 of the nut 216. The marking 251 may take a wide variety of different forms and may be any combination of markings and/or structures on the body 212, the nut 216, and/or the ring 202.

A conduit gripping component nose portion 134 is positioned at least partially within the camming mouth formed by the ferrule camming surface 292. The driven surface 162 of the conduit gripping device 120 engages the drive surface 274 of the nut 216. When the fitting is pulled up, the conduit gripping device 220 bites and/or indents into the conduit surface S.

In the examples illustrated by FIGS. 2A and 2B, the external ring 202 is disposed around a neck 208 of the fitting body 212. The external ring 202 may be assembled to the neck 208 in a variety of different ways. For example, the ring 202 may have internal threads that mate with the external threads of the fitting body and allow the ring to be screwed onto the neck. Alternatively, a central opening 203 of the ring may be sized to fit over the threads, or the ring may be a split ring. The ring 202 abuts a wall 213 of the fitting body and a surface 243 of the nut 216. The fitting body 212, the nut 216 and/or the ring include one or more inclined surfaces that cause the amount of torque required to continue pulling-up the fitting to sharply increase, but allow further pull up when the increased torque is applied. The inclined surface or surfaces may be formed by the wall 213 of the male threaded body, the surface 243 of the nut which is radially outward of female threads 218 of the nut 216, and/or a surface or surfaces of the ring 202 that engage the fitting body 216 and/or the nut 216. The inclined surface or surfaces may take a wide variety of different forms.

In the embodiments illustrated by FIGS. 2A and 2B, a first inclined surface 245 is defined by the ring 202 and a second inclined surface 247 is disposed on the outer portion 243 of the nut. When the fitting 100 is pulled-up the ring 202 engages the fitting body 212 and the inclined surfaces 245, 247 engage one another to cause the amount of torque required to continue pulling up the fitting to sharply increase. The first inclined surface 245 and/or the second inclined surface 247 may be replaced with an engagement surface, such as a surface with an edge that is not tapered or a rounded surface.

Angling the inclined surface or surfaces such that the inclined surface or surfaces form an angle of less than ninety degrees with respect to the central axis X, for example an angle of between thirty degrees to sixty degrees with respect to the central axis X allows the fitting to be remade. Each remake of the fitting 200 progresses the fitting body 212 further into the nut 216 for each re-make, even if only slightly.

Figure 3A:
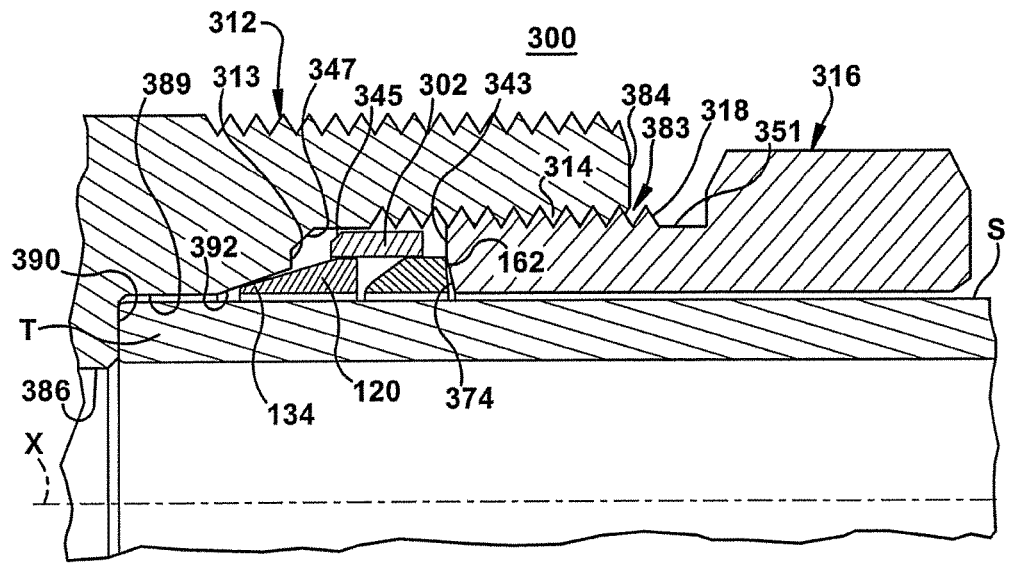
FIG. 3A is a longitudinal cross-section of an exemplary embodiment of a fitting with an internal ring that facilitates pull-up by torque where the fitting is in a loosely assembled condition.
Figure 3B:
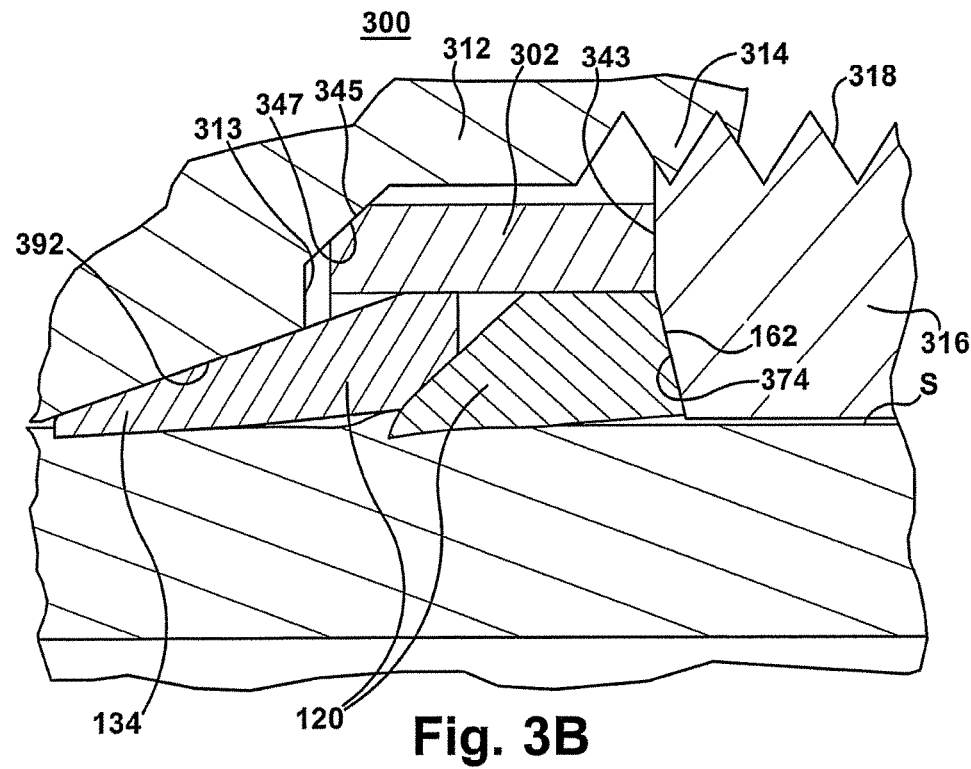
FIG. 3B is a longitudinal cross-section of an exemplary embodiment of a fitting with an internal ring that facilitates pull-up by torque where the fitting is in a pulled-up condition.

FIGS. 3A and 3B illustrate an embodiment of a female fitting 300 that includes an internal ring 302 that facilitates pull-up by torque. In one embodiment, the internal ring 302 is configured to convert an existing fitting that may be pulled up only by turns to a fitting that may be pulled up by turns and may optionally be pulled up by torque. The fitting 300 includes at least one first fitting component 312 that may be realized in the form of a female threaded body having internal threads 314 and a second fitting component 316 that may be realized in the form of a male threaded nut having external threads 318. Different thread options and non-threaded coupling designs may be used for the first and second fitting components. The fitting 300 further includes a conduit gripping device 120. In the example illustrated by FIGS. 3A and 3B, front and rear ferrules are illustrated. However, the conduit gripping device 120 may comprise a single ferrule as indicated above. The nut 316 and conduit gripping device 120 fit onto a conduit end T that is received by the body 312.

The male nut 316 has a drive surface 374 that contacts a driven surface 162 of the conduit gripping device 120 during pull-up. The female threaded body 312 is a generally cylindrical part centered on the axis X. The body 312 has an opening 383 at a forward end 384 adapted to receive the conduit end T. A central bore 386 extends through the body 312. The female body further includes a counterbore 389 that forms a shoulder 390. The conduit end T bottoms against the shoulder 390 when received by the body 312.

The female fitting component 312 further includes a tapered surface, such as for example frusto-conical surface 392. The frusto-conical surface 392 forms a ferrule camming surface in the body 312 and may be axially adjacent the forward end of the counterbore 389. The ferrule camming surface is formed at an angle that may be selected to optimize the camming action with the nose portion 134 of the front conduit gripping device 120. In typical two ferrule and one ferrule fittings, this angle is about twenty degrees but may be any suitable value from about ten degrees to about sixty degrees.

The body 312 and/or the nut 316 may include a marking or structure 351 that may be used to provide an intrinsic gauging function to verify proper pull-up for both pull-up by torque and pull-up by turns. In the example illustrated by FIGS. 3A and 3B, the marking 351 comprises an unthreaded neck of the male nut. The marking 351 may take a wide variety of different forms and may be any combination of markings and/or structures on the body 312, and/or the nut 316.

The nose portion 134 of a first conduit gripping component 120 is positioned partially within the camming mouth formed by the ferrule camming surface 392. A driven surface 162 of a second conduit gripping device engages the drive surface 374 of the nut 316. When the fitting is pulled up, the one or both of the ferrules 120 bite or indent into the conduit surface S.

In the examples illustrated by FIGS. 3A and 3B, the internal ring 302 is disposed in the fitting body 312. The internal ring 302 may be disposed around all or a portion of the conduit gripping device 120 or the ring 302 may be axially spaced from a conduit gripping device. The ring 302 abuts an interior surface 313 of the fitting body and a surface 343 of the nut 316. The fitting body 312, the nut 316 and/or the ring 302 includes an inclined surface that causes the amount of torque required to continue pulling-up the fitting to sharply increase. The inclined surface or surfaces may be formed by the interior surface 313 of the female threaded body, the surface 343 of the male nut which is radially inward of male threads 318 of the nut 316, and/or a surface or surfaces of the ring 302 that engage the fitting body 312 and/or the nut 316. The inclined surface or surfaces may take a wide variety of different forms.

In the embodiment illustrated by FIGS. 3A and 3B, a first inclined surface 345 is defined by the ring 302 and a second inclined surface 347 is disposed on the interior surface 313 of the female fitting body. Referring to FIG. 3B, when the fitting 300 is pulled-up, the ring 302 engages the nut 316 and the inclined surfaces 345, 347 engage one another to cause the amount of torque required to continue pulling up the fitting to sharply increase. The first inclined surface 345 and/or the second inclined surface 347 may be replaced with an engagement surface, such as a surface with an edge that is not tapered or a rounded surface.

Angling the inclined surface or surfaces such that the inclined surface or surfaces form an angle of less than ninety degrees with respect to the central axis X, for example an angle between thirty degrees to sixty degrees with respect to the central axis X allows the fitting to be remade. Each remake of the fitting 300 progresses the nut 316 further into the fitting body 312 for each re-make, even if only slightly.

Figure 4A:
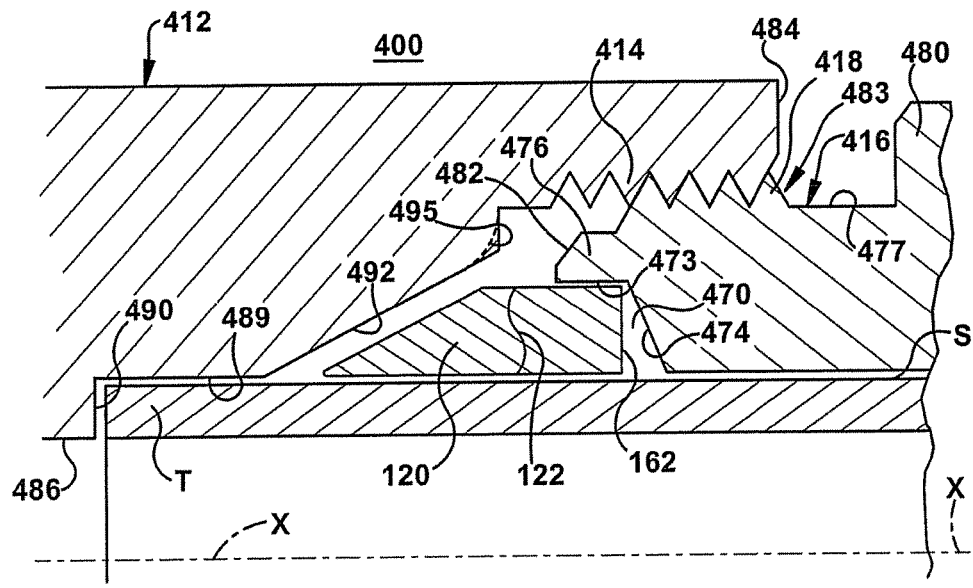
FIG. 4A is a longitudinal cross-section of an exemplary embodiment of a fitting with a fitting body having an internal inclined surface that facilitates pull-up by torque.
Figure 4B:
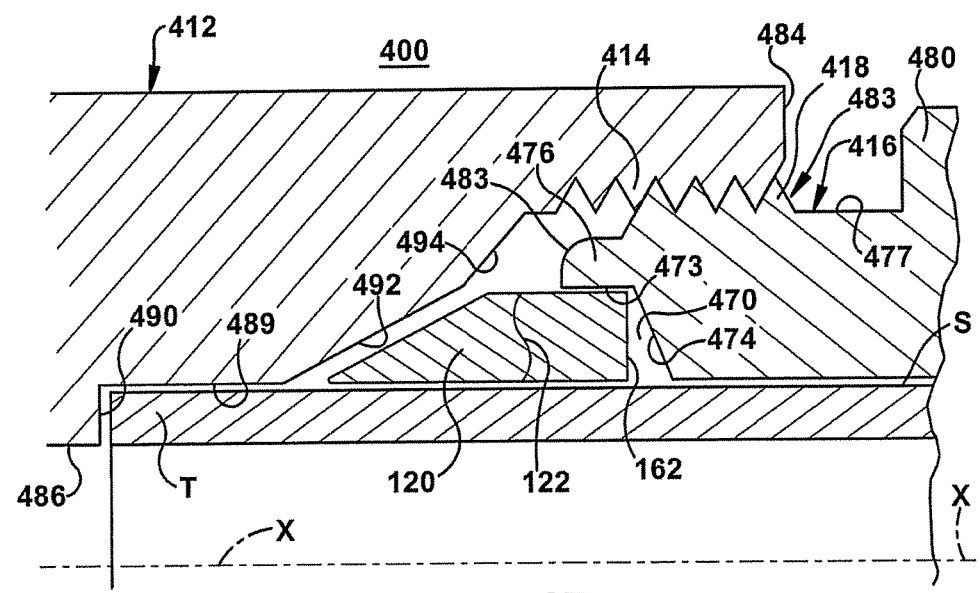
FIG. 4B is a longitudinal cross-section of an exemplary embodiment of a fitting with a nut having an inclined surface that is radially inward of threads of the nut that facilitates pull-up by torque.

FIGS. 4A and 4B illustrate embodiments of fittings 400 that include a male nut 416 and a female fitting body 412 that engage one another inside the female fitting body to facilitate pull-up by torque. The female threaded body has internal threads 414. The female fitting body 412 joins or connects with the male threaded 416 nut having external threads 418. The fittings 400 further include a conduit gripping device 120. The nut 416 and conduit gripping device 120 fit onto a conduit end T that is received by the body 412.

The nut 416 has an overall cylindrical configuration defining a central bore 466 that receives the conduit end T during assembly. The nut 416 has a front end that defines a socket, recess or cage 470. The socket 470 includes a cylindrical portion 473 and a frusto-conical portion 474 that tapers radially inwardly towards a back end of the nut 416. The frusto-conical portion 474 forms a drive surface that contacts the driven surface 162 of the conduit gripping device 120.

The socket 470 is formed within an axially extending and generally cylindrical wall or cartridge 476. The cartridge 476 may be sized to retain a back ferrule and at least a portion of a front ferrule, or only the back ferrule or a portion of the back ferrule when two ferrules are used. The cartridge may also be sized to retain all or a portion of a single ferrule. The cartridge may also be omitted. The cartridge 476 and conduit gripping device form a cartridge nut assembly. The term cartridge as used herein is a shorthand reference to the concept of a fitting component, in this example a male threaded nut 416 having a structure that may retain one or more ferrules therewith even when the assembly is uninstalled with the mating fitting component. Thus, the cartridge nut assembly 478, which includes the cartridge nut 416 and a conduit gripping device 120, such as one or more ferrules. The cartridge nut 416 may be used to retain the ferrules and nut together when the assembly is either uninstalled or only installed in the body 412 in a finger tight condition.

Many different techniques may be used to retain the conduit gripping device within the cartridge nut 416 prior to final pull-up or even initial assembly into the mating fitting component. Several techniques that may be used are disclosed in United States Patent Application Publication No.: 2005/0242582, published on Nov. 3, 2005, and assigned to the assignee of the present application.

In the example illustrated by FIG. 4B, the cartridge 476 includes a tapered portion 482 that tapers radially outwardly towards the back end of the nut 416. The tapered portion 482 extends at an angle that is less than ninety degrees. For example, the angle may be between thirty degrees and sixty degrees, such as forty-five degrees with respect to the central axis X. In the example illustrated by FIG. 4A, the tapered portion 482 is replaced with an engagement surface, such as the illustrated rounded surface 483.

The nut 416 further includes a tool engagement portion 480 that allows a torque wrench or other tool to be used to tighten and pull-up the fitting 410. The tool engagement portion 480 may take a wide variety of different forms. Examples of some forms of the tool engagement that may be used are disclosed in United States Patent Application Publication No.: 2005/0242582.

The nut 416 may further include a neck 477 of somewhat reduced outer diameter between the threads 418 and the tool engagement portion 480. The neck 477 may be used to provide an intrinsic gauging function to verify proper pull-up for both pull-up by torque and pull-up by turns.

The female threaded body 412 is a generally cylindrical part centered on the axis X. The body 412 has an opening 483 at a forward end 484 adapted to receive the conduit end T. A central bore 486 extends through the body 412 and defines a fluid flow path. The female body further includes a counterbore 489 that forms a shoulder 490. The conduit end T bottoms against the shoulder 490 when received by the body 412.

In the example illustrated by FIG. 4A, the female fitting component 412 further includes a first tapered surface, such as for example frusto-conical surface 492 and a second tapered surface, such as for example frusto-conical surface 494. In the example illustrated by FIG. 4B, the second tapered surface is replaced with an engagement surface 495, such as the edge (illustrated in solid lines) or the curved surface (illustrated in broken lines). The first frusto-conical surface 492 forms a first or ferrule camming surface in the body 412 and may be axially adjacent the forward end of the counterbore 489. In the example illustrated by FIG. 4A, the surface 494 is formed at an angle between thirty degrees and sixty degrees, for example, about forty-five degrees, with respect to the central axis X but other angles may be used.

In the embodiment illustrated by FIG. 4A, the tapered surface 494 of the female threaded body engages the rounded surface 483 of the male nut and causes the amount of torque required to continue pulling up the fitting to sharply increase. In the embodiment illustrated by FIG. 4B, the tapered portion 482 of the male threaded nut engages the engagement surface 495 of the female threaded body and causes the amount of torque required to continue pulling up the fitting to sharply increase.

Angling the inclined surface such that the inclined surface forms an angle with respect to the central axis X allows the fitting to be remade. Each remake of the fitting 400 progresses the nut 416 further into the fitting body 416 for each re-make, even if only slightly.

Figure 5A:
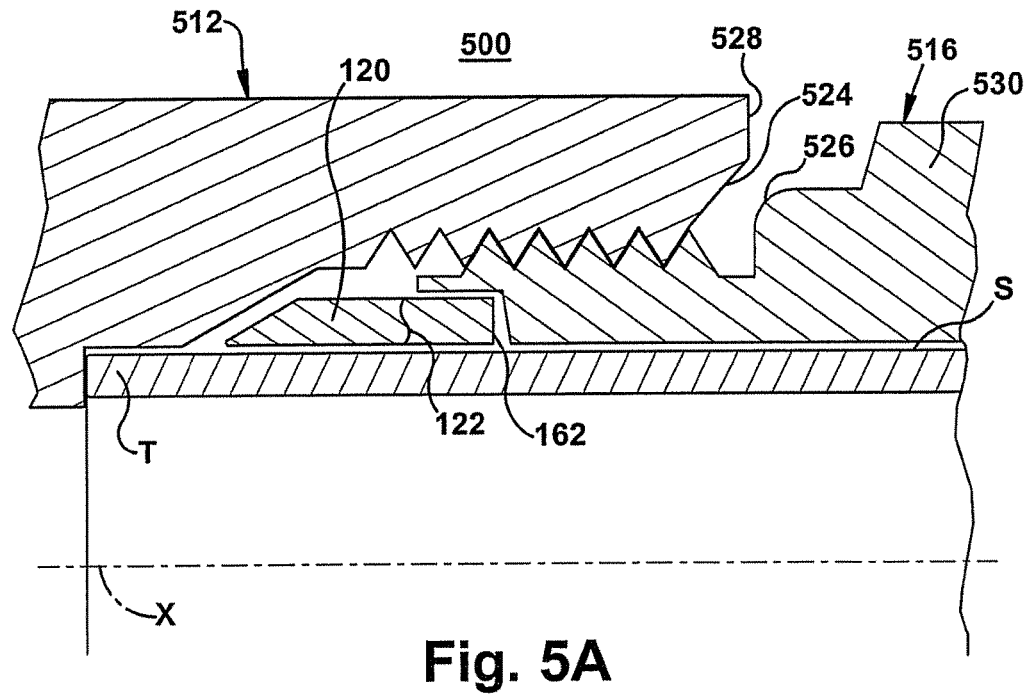
FIG. 5A is a longitudinal cross-section of an exemplary embodiment of a fitting with a fitting body having an external inclined surface that facilitates pull-up by torque.
Figure 5B:
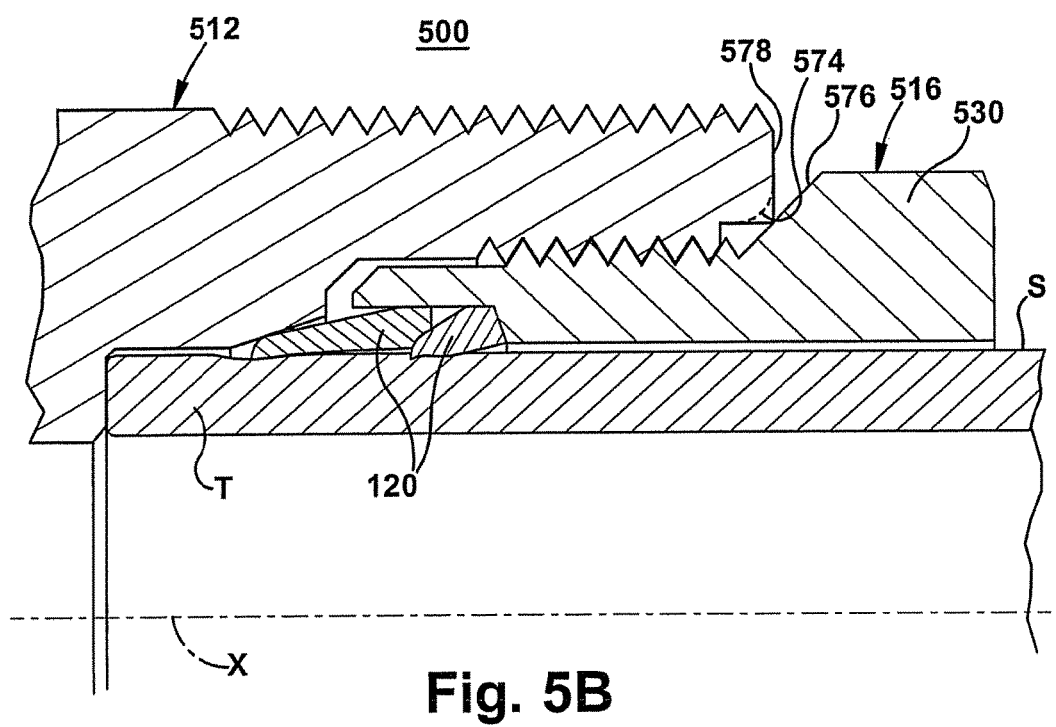
FIG. 5B is a longitudinal cross-section of an exemplary embodiment of a fitting with a nut having an inclined surface that is radially outward of external threads of the nut that facilitates pull-up by torque.

FIGS. 5A and 5B illustrate a half longitudinal cross-section of additional exemplary fittings 500 of the present invention. In these embodiment, the fitting 500 includes a body 512, a nut 516, and a conduit gripping device. The embodiments illustrated in FIGS. 5A and 5B are similar to the embodiments of FIGS. 4A and 4B, except the inclined surfaces used for pull-up by torque are disposed on external surfaces of the fittings. In the embodiment illustrated by FIG. 5A, the body 512 includes an exterior camming surface 524 that engages an engagement surface 526, such as the illustrated rounded surface, on the nut 516 upon proper pull-up. The exterior camming surface 524 may be located on a forward end 528 of the body 512. The engagement surface 526 may be located, for example, on a tool engagement portion such as a hex portion 530. In the embodiment illustrated by FIG. 5B, the body 512 includes an exterior engagement surface 574, such as the illustrated edge (solid lines) or rounded surface (dashed lines). The exterior engagement surface 574 engages a tapered surface 576 on the nut 516 upon proper pull-up. The engagement surface 574 may be located on a forward end 578 of the body 512. The tapered surface 576 may be located, for example, on a tool engagement portion such as a hex portion 530. In the embodiments of FIGS. 5A and 5B, the engagement between the body and the nut provides both a pull-up by torque function and an intrinsic gauge function for initial pull-up.

Figure 6A:
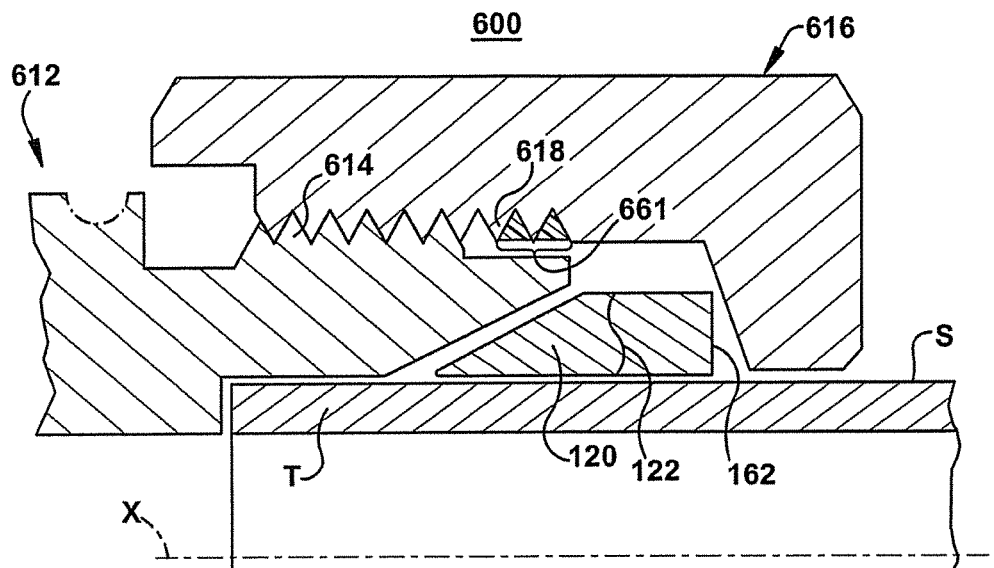
FIG. 6A is a longitudinal cross-section of an exemplary embodiment of a fitting with threads that facilitate pull-up by torque.
Figure 6B:
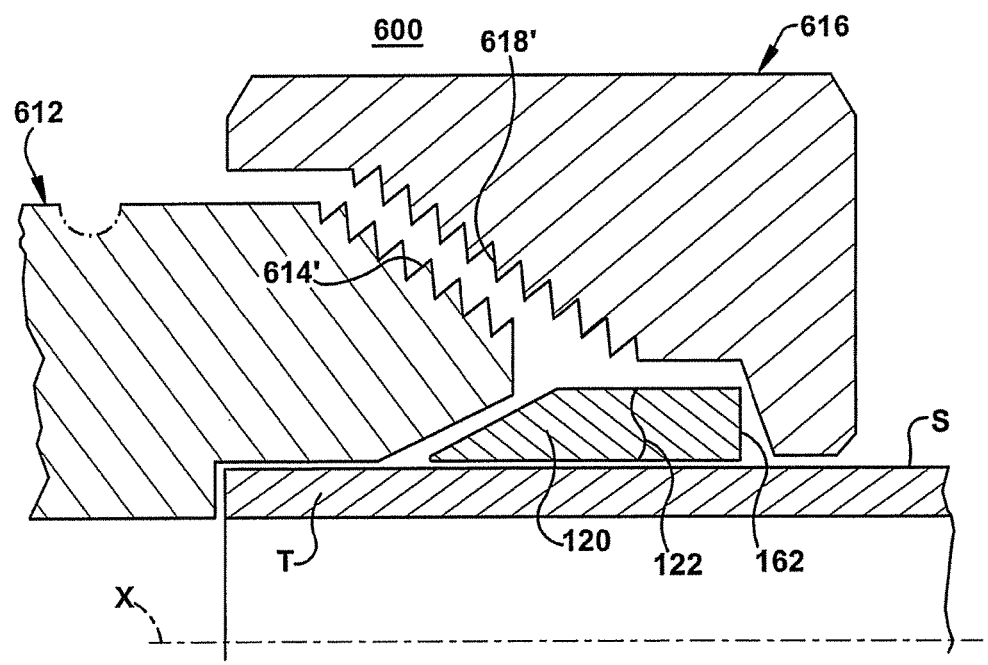
FIG. 6B is a longitudinal cross-section of an exemplary embodiment of a fitting with tapered threads that facilitate pull-up by torque.
Figure 6C:
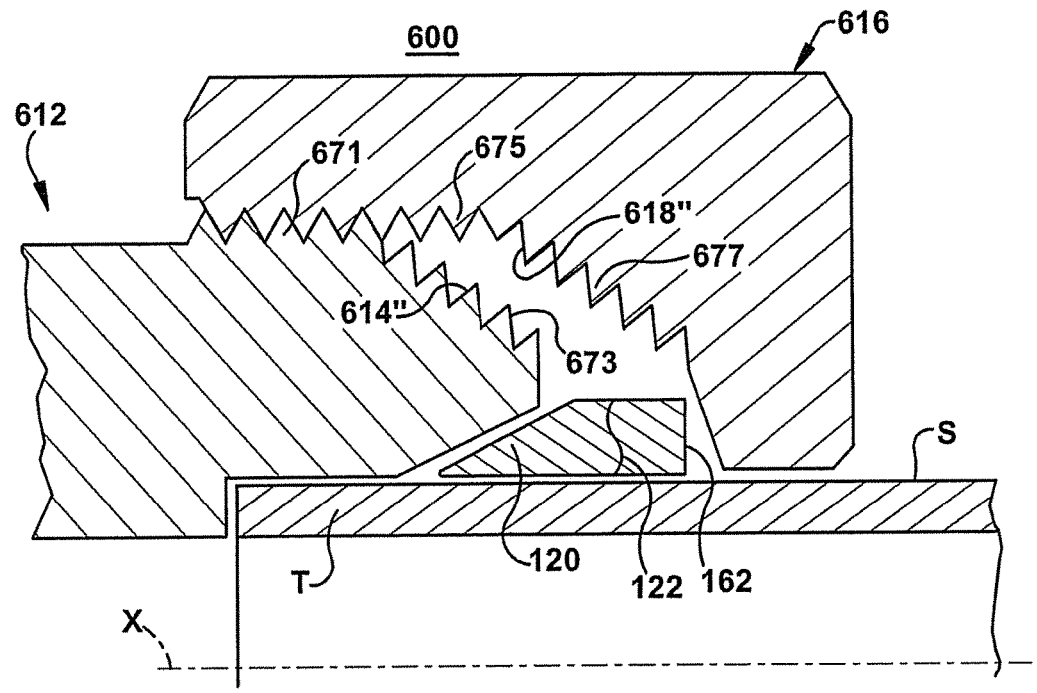
FIG. 6C is a longitudinal cross-section of an exemplary embodiment of a fitting with straight threads and tapered threads that facilitate pull-up by torque.

FIGS. 6A, 6B, and 6C illustrate half longitudinal cross-section of another exemplary fitting 600 of the present invention. In this embodiment, the fitting 600 includes a body 612, a nut 616, and a conduit gripping device 120. The embodiments of FIGS. 6A, 6B, and 6C differ from the previously described embodiments in that the fitting body threads 614 and/or the nut threads 618 are configured to provide a sharp rise in torque when the fitting is properly pulled up. FIGS. 6A, 6B, and 6C illustrate fittings with a male fitting body and a female nut. However, the concept of configuring threads to provide a sharp rise in torque when the fitting is properly pulled up is applicable to all fittings that use a conduit gripping member, including but not limited to fittings with a male fitting body and a female nut and fittings with a female fitting body and a male nut. Since the threads 614 and/or 618 are configured to provide a sharp rise in torque when the fitting is properly pulled up, an inclined surface does not need to engage a fitting component to facilitate pull-up by torque.

The threads 614 and/or 618 may be configured to provide a sharp rise in torque when the fitting is properly pulled up in a wide variety of different ways. In the example illustrated by FIG. 6A, the threads 614 and 618 are generally parallel to the central axis X of the fitting, but are configured to provide a sharp rise in torque when the fitting is properly pulled up. In one embodiment, the threads 614, 618 are treated or coated, for example with a plastic coating, to provide a sharp rise in torque when the fitting is properly pulled up. In another embodiment, the pitch of the fitting body threads 614 and/or the pitch of the nut threads 618 varies to provide a sharp rise in torque when the fitting is properly pulled up. For example, a rear portion 661 of the nut threads 618 may have a different pitch than a remainder of the nut threads and the fitting body threads 614. As a result, a sharp rise in torque will occur when the rear portion 661 of the threads engage the fitting body threads 614.

In the embodiment illustrated by FIG. 6B, the fitting body threads 614' and the nut threads 618' are tapered at an angle with respect to the central axis X of the fitting. The taper of the threads provides a sharp rise in torque when the fitting is pulled up.

In the embodiment illustrated by FIG. 6C, the fitting body threads 614" includes a straight portion 671 that is generally parallel to the central axis X and a tapered portion 673 that is tapered at an angle with respect to the central axis X. Similarly, the nut threads 618" includes a straight portion 675 that is generally parallel to the central axis X and a tapered portion 677 that is tapered at an angle with respect to the central axis X. When the straight portion 671 of the fitting body threads 614" engages the straight portion 675 of the nut threads 618" and the tapered portion 673 of the fitting body threads does not engage the tapered portion 677 of the nut threads, the torque required to tighten the body and nut rises rather gradually and is due mostly to deformation of the conduit gripping device 120. When the tapered portion 673 of the fitting body threads engages the tapered portion 677 of the nut threads, the torque required to tighten the body and nut rises sharply and indicates that the fitting is properly pulled up.

Figure 7:
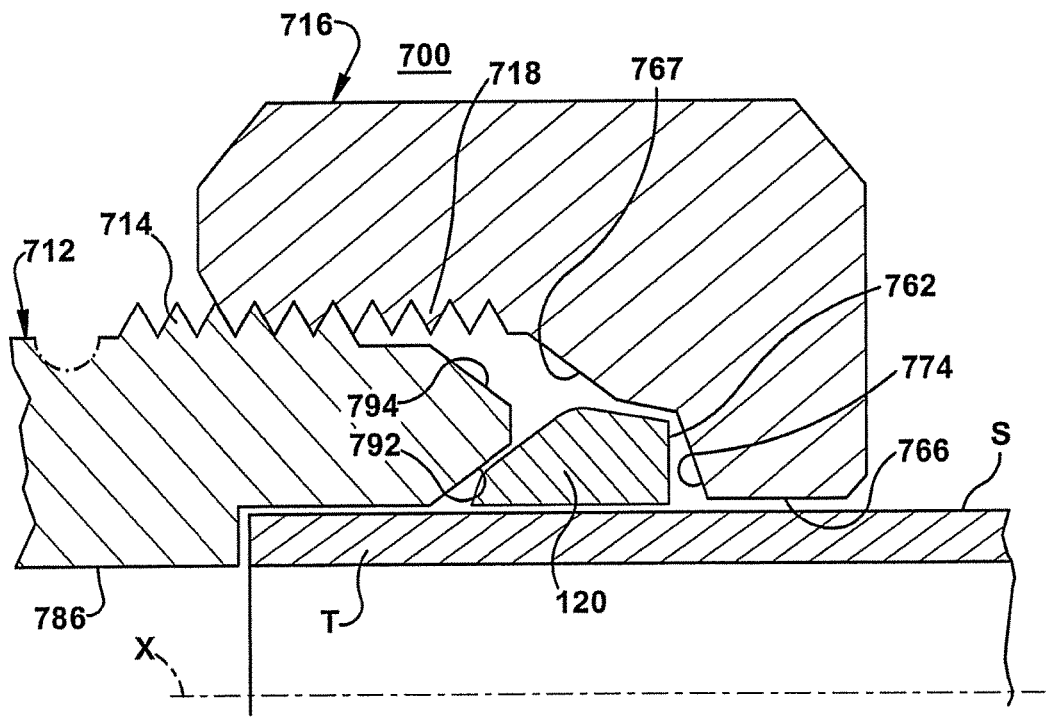
FIG. 7 is a longitudinal cross-section of an exemplary embodiment of a single ferrule fitting that includes inclined surfaces that facilitate pull-up by torque.

FIG. 7 illustrates an embodiment of a single ferrule fitting 700 that includes one or more inclined surfaces that facilitate pull-up of the fitting by torque and includes a steep camming surface for driving a nose of a single ferrule into the conduit. In one exemplary embodiment, the single ferrule is hardened to at least 3.3 times harder than the material of the conduit on the Vickers scale. The illustrated fitting 700 includes a female nut 716 and a male fitting body 712. However, the fitting 700 illustrated by FIG. 7 may also take a female form. The male threaded body 712 has external threads 714. The male fitting body 712 joins or connects with the female threaded nut 716 having internal threads 718. The fitting 700 further includes a conduit gripping device in the form of a single ferrule 720. The nut 716 and the single ferrule 720 fit onto a conduit end T that is assembled with the body 712.

The nut 716 has an overall cylindrical configuration defining a central bore 766 that receives the conduit end T during assembly. The nut 716 includes an interior drive surface 774 configured to engage a driven surface 762 of the single ferrule 720. The nut 716 includes a tapered surface 767 that is configured to engage a tapered surface 794 of the fitting body to provide a sharp torque rise that indicates that the fitting is properly pulled up.

The male threaded body 712 is a generally cylindrical part centered on the axis X. The body 712 is adapted to receive the conduit end T. A central bore 786 extends through the body 712 and defines a fluid flow path.

In the example illustrated by FIG. 7, the male fitting component 712 further includes a first tapered surface, such as for example frusto-conical surface 792 and a second tapered surface, such as for example frusto-conical surface 794. The first frusto-conical surface 792 forms a first or ferrule camming surface in the body 712. The first tapered surface 792 is a relatively steep camming surface that is configured to drive a nose of the conduit gripping device 120 into the conduit. The tapered surface 792 may form an angle of between thirty degrees and sixty degrees with respect to the central axis X. For example, the tapered surface may form an angle of about forty-five degrees with respect to the central axis X. The second tapered surface 794 is formed at an angle that is between thirty degrees and sixty degrees, for example, about forty-five degrees with respect to the central axis X, but other angles may be used.

The tapered surface 794 of the male threaded body engages the tapered surface 767 of the female nut and causes the amount of torque required to continue pulling up the fitting to sharply increase. Angling the inclined surfaces such that the inclined surfaces form an angle of less than ninety degrees with respect to the central axis X, for example an angle between thirty degrees to sixty degrees with respect to the central axis X allows the fitting to be remade. Each remake of the fitting 700 progresses the fitting body 712 further into the nut 712 for each re-make, even if only slightly.

FIGS. 8-11 illustrate embodiments of fittings 800, 900, 1000, 1100 that include fitting bodies with a shallow tapered surface for bringing a ferrule into engagement with a conduit and a steep tapered surface that engages a ferrule to provide a sharp increase in torque that indicates that the fitting is properly pulled up. The fitting body may be configured in a wide variety of different ways to include a shallow tapered surface and a steep tapered surface. Further, the conduit gripping device may be configured in a wide variety of different ways to work with different shallow and steep camming surfaces. FIGS. 8-11 illustrate four of the many possible configurations.

Figure 8:
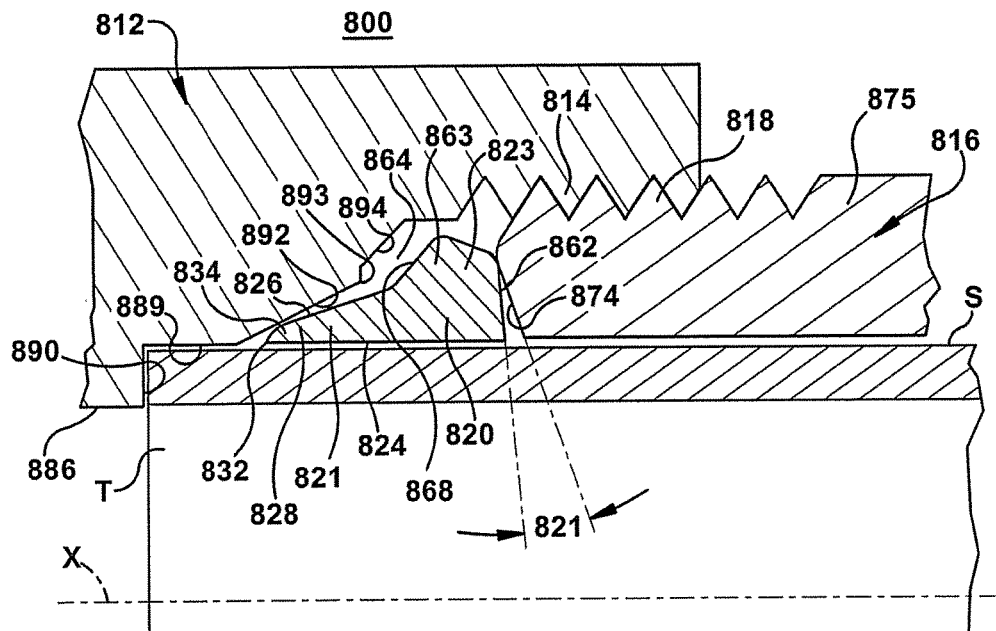
FIG. 8 is a longitudinal cross-section of an exemplary embodiment of a fitting with a single ferrule and a fitting body that are configured to facilitate pull-up by torque.

The fitting 800 illustrated by FIG. 8 is a female-style fitting, but may also be configured as a male-style fitting. The fitting 800 includes a nut 816, a single ferrule 820 and a fitting body 812 that includes a shallow tapered surface 892 that cams the ferrule into engagement with the conduit end T and a steep tapered surface 894 that engages the single ferrule 820 to facilitate pull-up by torque. The female threaded body has internal threads 814. The female fitting body 812 joins or connects with the male threaded 816 nut having external threads 818. Different thread options and non-threaded coupling designs may be used for the first and second fitting components. The nut 816 and single ferrule 820 fit onto a conduit end T that is received by the body 812.

The nut 816 has an overall cylindrical configuration that receives the conduit end T during assembly. The nut 816 has a frusto-conical portion 874 that tapers radially inwardly toward a back end 875 of the nut 816. The frusto-conical portion 874 forms a drive surface that contacts a driven surface 862 of the single ferrule 820. A difference angle 821 is formed between the drive surface 874 of the nut and the driven surface 862 of the single ferrule 820. The nut 816 is illustrated as not including a cartridge that surrounds all or a portion of the single ferrule 820. However, a cartridge, such as the cartridge illustrated by FIG. 4A may be included.

The female threaded body 812 is a generally cylindrical part centered on the axis X. The body 812 has an opening 883 at a forward end 884 that is adapted to receive the conduit end T. A central bore 886 extends through the body 812 and forms a fluid flow path. The female body further includes a counterbore 889 that forms a shoulder 890.

The female fitting component 812 includes the shallow tapered surface, such as for example frusto-conical surface 892 and the steep tapered surface, such as for example frusto-conical surface 894. The shallow frusto-conical surface 892 forms a first or ferrule camming surface in the body 812 and may be axially adjacent the forward end of the counterbore 889. The steep frusto-conical surface 894 extends from the shallow surface toward the fitting body threads 814. An optional protrusion 893 may be included between the shallow tapered surface 892 and the steep tapered surface 894 to enhance a hinging action of the single ferrule 820. In the example illustrated by FIG. 8, the shallow tapered surface 892 is formed at an angle between ten degrees and thirty degrees with respect to the central axis X, but other angles may be used. The steep tapered surface 894 is formed at an angle between thirty degrees and sixty degrees with respect to the central axis X, but other angles may be used.

The single ferrule 820 is a generally annular part with a generally cylindrical interior wall 824 that slips over the outer surface S of the conduit end T. The single ferrule 820 includes a front portion 821 and a rear portion 823. The front portion 821 has an outer surface 826 that tapers outwardly in a generally conical manner to the rearward portion 823. The front portion 821 may include a sharp front edge 832 and a rounded nose portion 834. The rear portion 823 includes a driven surface 862 that extends radially outwardly at an angle, such as about five degrees (referenced from normal to the axis X), for example. The rear portion 823 also includes an enlarged radially extending flange 863. The flange 863 is sized to fit within a bore 864 of the fitting body 812. The flange 862 includes a tapered surface 868 at a forward portion of the flange. The tapered surface 868 extends at an angle between thirty degrees and sixty degrees, such as about forty-five degrees, with respect to the central axis X. The tapered surface 868 engages the steep camming surface 894 of the body 812 during pull-up to provide a sharp torque rise that indicates that the fitting is properly pulled up.

When the fitting 800 is in a finger tight condition, the front portion 826 is positioned partially within the camming mouth formed by the ferrule camming surface 892. The rear portion 823 engages the drive surface 874 of the nut 816 at the difference angle 821. This assures that during pull-up the rear portion 823 will move or remain radially outward from the outer surface S of the conduit end T. At the same time, the nose portion 828 is plastically deformed so that the sharp edge 832 bites or indents into the conduit surface S, producing a strong conduit gripping shoulder and a fluid tight seal. The ferrule nose 828 also hinges so that a portion of the cylindrical wall 824 is radially compressed against the conduit wall surface S to swage or collet the single ferrule 820 against the surface axially spaced from the bite. When the single ferrule hinges during pull-up, the tapered surface 868 of the ferrule rotates into contact with the steep camming surface 894. The engagement between tapered surface 868 of the rear portion 823 of the single ferrule and the steep camming surface 894 of the fitting body 812 cause a torque required to further pull-up the fitting to sharply rise. This sharp rise in torque required to further pull-up the fitting provides an indication that the fitting is properly pulled up.

Angling the steep camming surface 894 and/or the surface 868 of the ferrule that engages the steep camming surface with respect to the central axis X allows the fitting to be remade. Each remake of the fitting 800 progresses the nut 816 and single ferrule 820 further into the fitting body 816, even if only slightly.

Figure 9:
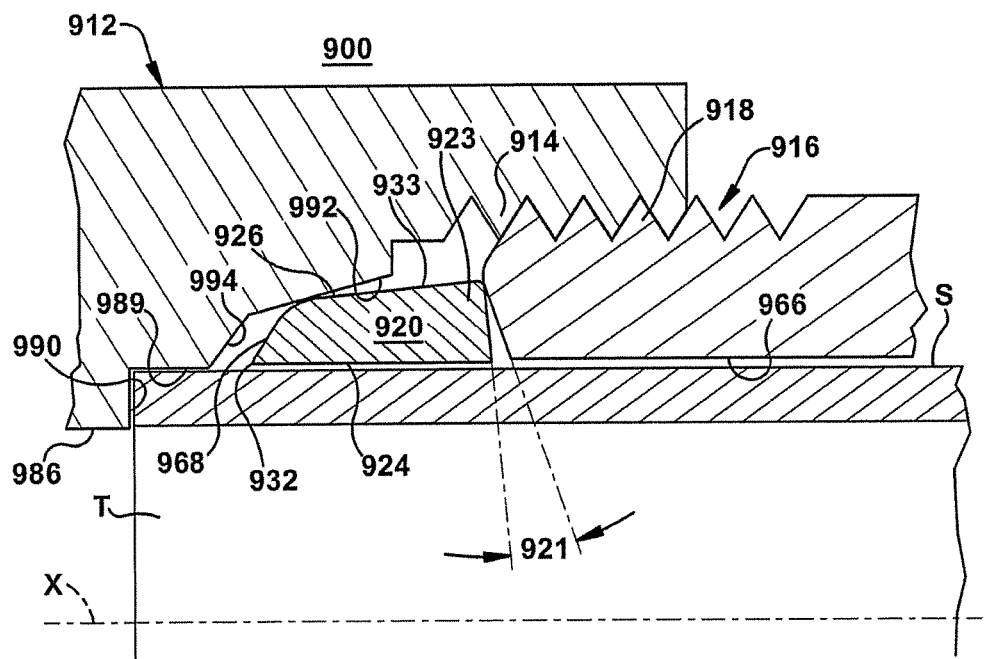
FIG. 9 is a longitudinal cross-section of an exemplary embodiment of a fitting with a single ferrule and a fitting body that are configured to facilitate pull-up by torque.

The fitting 900 illustrated by FIG. 9 is a female-style fitting, but may also be configured as a male-style fitting. The fitting 900 includes a nut 916, a single ferrule 920 and a fitting body 912 that includes a shallow tapered surface 992 that cams the ferrule into engagement with the conduit end T and a steep tapered surface 994 that engages the single ferrule 920 to facilitate pull-up by torque. The female threaded body has internal threads 914. The female fitting body 912 joins or connects with the male threaded 916 nut having external threads 918. The nut 916 and single ferrule 920 fit onto a conduit end T that is received by the body 912.

The nut 916 has an overall cylindrical configuration defining a central bore 966 that receives the conduit end T during assembly. The nut 916 has a frusto-conical portion 974 that tapers radially inwardly towards a back end of the nut 916. The frusto-conical portion 974 forms a drive surface that contacts a driven surface 962 of the single ferrule 920. A difference angle 921 is formed between the drive surface 974 of the nut and the driven surface 962 of the single ferrule 920. The nut 916 is illustrated as not including a cartridge that surrounds all or a portion of the single ferrule 920. However, a cartridge, such as the cartridge illustrated by FIG. 4A may be included.

The female threaded body 912 is a generally cylindrical part centered on the axis X. The body 912 is adapted to receive the conduit end T. (A central bore 986 extends through the body 912 and defines a fluid flow path.) The female body further includes a counterbore 989 that forms a shoulder 990. The conduit end T bottoms against the shoulder 990 when received by the body 912.

In the example illustrated by FIG. 9, the female fitting component 912 further includes a steep tapered surface, such as for example frusto-conical surface 994 and a shallow tapered surface, such as for example frusto-conical surface 992. The steep frusto-conical surface 994 may be axially adjacent the forward end of the counterbore 989. The shallow frusto-conical surface 994 forms a ferrule camming surface in the body 914 and extends from the steep surface 994 toward the fitting body threads 914. In the example illustrated by FIG. 9, the shallow tapered surface 992 is formed at an angle between ten degrees and thirty degrees with respect to the central axis X, but other angles may be used. The steep tapered surface 994 is formed at an angle between thirty degrees and sixty degrees with respect to the central axis X, but other angles may be used.

The single ferrule 920 is a generally annular part with a generally cylindrical interior wall 924 that slips over the outer surface S of the conduit end T. The single ferrule 920 includes an outer surface 926 that includes a steep tapered surface 968 that extends radially outwardly and rearwardly from a sharp front edge 932 and gradually tapered surface 933 that tapers outwardly in a generally conical manner from the steep tapered surface 968 to a rearward portion 923 of the ferrule. The rear portion 923 includes the driven surface 962 that extends radially outwardly at an angle, such as about five degrees (referenced from normal to the axis X), for example. The steep tapered surface 968 extends at an angle between thirty degrees and sixty degrees, such as about forty-five degrees, with respect to the central axis X. The tapered surface 968 engages the steep camming surface 994 of the body 912 once the fitting is properly pulled-up to provide a sharp torque rise that indicates that the fitting is properly pulled up.

The single ferrule 920 is positioned partially within the camming mouth formed by the ferrule camming surface 992. The rear portion 923 engages the drive surface 974 of the nut 916 at the difference angle 921. This assures that during pull-up the rear portion 923 will move or remain radially outward from the outer surface S of the conduit end T. At the same time, the front of the ferrule is plastically deformed so that the sharp edge 932 bites or indents into the conduit surface S, producing a strong conduit gripping shoulder and a fluid tight seal. The ferrule 920 also hinges so that a portion 902 of the cylindrical wall 924 is radially compressed against the conduit wall surface S to swage or collet the single ferrule 920 against the surfaces axially spaced from the bite.

When the fitting is being pulled up, the nut 916 advances the steep front surface 968 of the single ferrule into contact with the steep camming surface 994. The engagement between steep tapered surface 968 of the single ferrule and the steep camming surface 994 of the fitting body 912 cause a torque required to further pull-up the fitting to sharply rise. This sharp rise in torque required to further pull-up the fitting provides an indication that the fitting is properly pulled up. Angling the steep camming surface 994 and/or the surface 968 of the ferrule that engages the steep camming surface to form an angle of less than ninety degrees with respect to the central axis, for example between thirty degrees to sixty degrees with respect to the central axis X allows the fitting to be remade. Each remake of the fitting 900 progresses the single ferrule 920 further into the fitting body 916 for each re-make, even if only slightly.

FIG. 10 illustrates an embodiment of a fitting 1000 that is similar to the embodiment shown in FIG. 8, but includes two ferrules. The fitting 1000 illustrated by FIG. 10 is a female-style fitting, but may also be configured as a male-style fitting. The fitting 1000 includes a nut 1016, a front ferrule 1019, a rear ferrule 1020 and a fitting body 1012. The fitting body 1012 includes a shallow tapered surface 1092 that cams the front ferrule 1019 into engagement with the conduit end T and a steep tapered surface 1094 that engages a rear ferrule 1020 to facilitate pull-up by torque. The female threaded body has internal threads 1014. The female fitting body 1012 joins or connects with the male threaded nut 1016 having external threads 1018. The nut 1016, the front ferrule 1019, and the rear ferrule 1020 fit onto a conduit end T that is received by the body 1012.

The nut 1016 has a frusto-conical portion 1074 that tapers radially inwardly towards a back end of the nut 1016. The frusto-conical portion 1074 forms a drive surface that contacts a driven surface 1062 of the rear ferrule 1020. A difference angle 1021 is formed between the drive surface 1074 of the nut and the driven surface 1062 of the ferrule 1020. The nut 1016 is illustrated as not including a cartridge that surrounds all or a portion of the single ferrule 1020. However, a cartridge, such as the cartridge illustrated by FIG. 4A may be included.

The female threaded body 1012 is a generally cylindrical part centered on the axis X. The body 1012 is adapted to receive the conduit end T. A central bore 1086 extends through the body 1012 and defines a fluid flow path. The female body further includes a counterbore 1089 that forms a shoulder 1090. The conduit end T bottoms against the shoulder 1090 when received by the body 1012.

The female fitting component 1012 further includes the shallow tapered surface, such as for example frusto-conical surface 1092 and the steep tapered surface, such as for example frusto-conical surface 1094. The shallow frusto-conical surface 1092 forms a ferrule camming surface in the body 1012 and may be axially adjacent the forward end of the counterbore 1089. The steep frusto-conical surface 1094 extends from the shallow surface toward the fitting body threads 1014. In the example illustrated by FIG. 10, the shallow tapered surface 1092 is formed at an angle between ten degrees and thirty degrees with respect to the central axis X, but other angles may be used. The steep tapered surface 1094 is formed at an angle between thirty degrees and sixty degrees with respect to the central axis X, but other angles may be used.

The front ferrule 1019 is a generally annular part with a generally cylindrical interior wall 1023 that slips over the outer surface S of the conduit end T. The front ferrule 1019 has an outer surface 1025 that tapers outwardly in a generally conical manner from a forward portion 1027 to a rearward portion 1029. The forward portion 1027 may include a sharp front edge 1031 and a rounded nose portion 1033. The rearward portion 1029 includes a frusto-conical recess 1035 that forms a camming surface.

The rear ferrule 1020 is a generally annular part with a generally cylindrical interior wall 1024 that slips over the outer surface S of the conduit end T. The rear ferrule 1020 includes a front portion 1021 and a rear portion 1023. The front portion 1021 has an outer surface 1026 that tapers outwardly in a generally conical manner to the rear portion 1023. The front portion 1021 may include a sharp front edge 1032 and a rounded nose portion 1034. The rear portion 1023 includes the driven surface 1062 that extends radially outwardly at an angle 1063, such as about five degrees (referenced from normal to the axis X), for example. The rear portion 1023 also includes an enlarged radially extending flange 1065. The flange 1065 is sized to fit within a bore 1064 of the fitting body 1012. The flange 1065 includes a tapered surface 1068 at a forward portion of the flange. The tapered surface 1068 extends at an angle between thirty degrees and sixty degrees, such as about forty-five degrees, with respect to the central axis X. The tapered surface 1068 engages the steep camming surface 1094 of the body 1012 during pull-up to provide a sharp torque rise that indicates that the fitting is properly pulled up.

The nose portion 1027 of the front ferrule 1019 is positioned partially within the camming mouth formed by the ferrule camming surface 1092. The rear ferrule 1020 engages the drive surface 1074 of the nut 1016 at a difference angle 1091. This assures that during pull-up the rear portion 1023 of the rear ferrule 1020 will move or remain radially outward from the outer surface S of the conduit end T. The front portion 1021 of the rear ferrule 1020 is plastically deformed so that the sharp edge 1032 bites or indents into the conduit surface S, producing a strong conduit gripping shoulder and a fluid tight seal. The front portion 1021 of the rear ferrule 1020 also hinges so that a portion 1002 of the cylindrical wall 1024 is radially compressed against the conduit wall surface S to swage or collet the rear ferrule 1020 against the surface axially spaced from the bite. When the rear ferrule 1020 hinges during pull-up, the tapered surface 1068 of the ferrule may rotate as it moves into contact with the steep camming surface 1094.

FIGS. 10A and 10B schematically illustrate a portion of the fitting body 1012' and a rear ferrule 1020' of an embodiment that is similar to the embodiment illustrated by FIG. 10. In the FIGS. 10A and 10B embodiment, the angle of the tapered surface 1068' and the angle of the steep camming surface 1094' are selected such that a difference angle 1099 is defined there between when the fitting is in a finger-tight condition (FIG. 10A). The difference angle diminishes as the tapered surface 1068' rotates as indicated by arrow due to hinging of the ferrule 1020' during pull-up. In an exemplary embodiment, the tapered surface 1068' becomes flush with the steep camming surface 1094' and the difference angle is eliminated when the surfaces 1068' and 1094' engage one another to indicate that the fitting is in a proper pulled-up condition.

The engagement between tapered surface 1068 of the rear portion 1023 of the rear ferrule and the steep camming surface 1094 of the fitting body 1012 cause a torque required to further pull-up the fitting to sharply rise. This sharp rise in torque required to further pull-up the fitting provides an indication that the fitting is properly pulled up. Angling the steep camming surface 1094 and/or the surface 1068 of the ferrule that engages the steep camming surface to form an angle of between thirty degrees to sixty degrees with respect to the central axis X allows the fitting to be remade.

Figure 11:
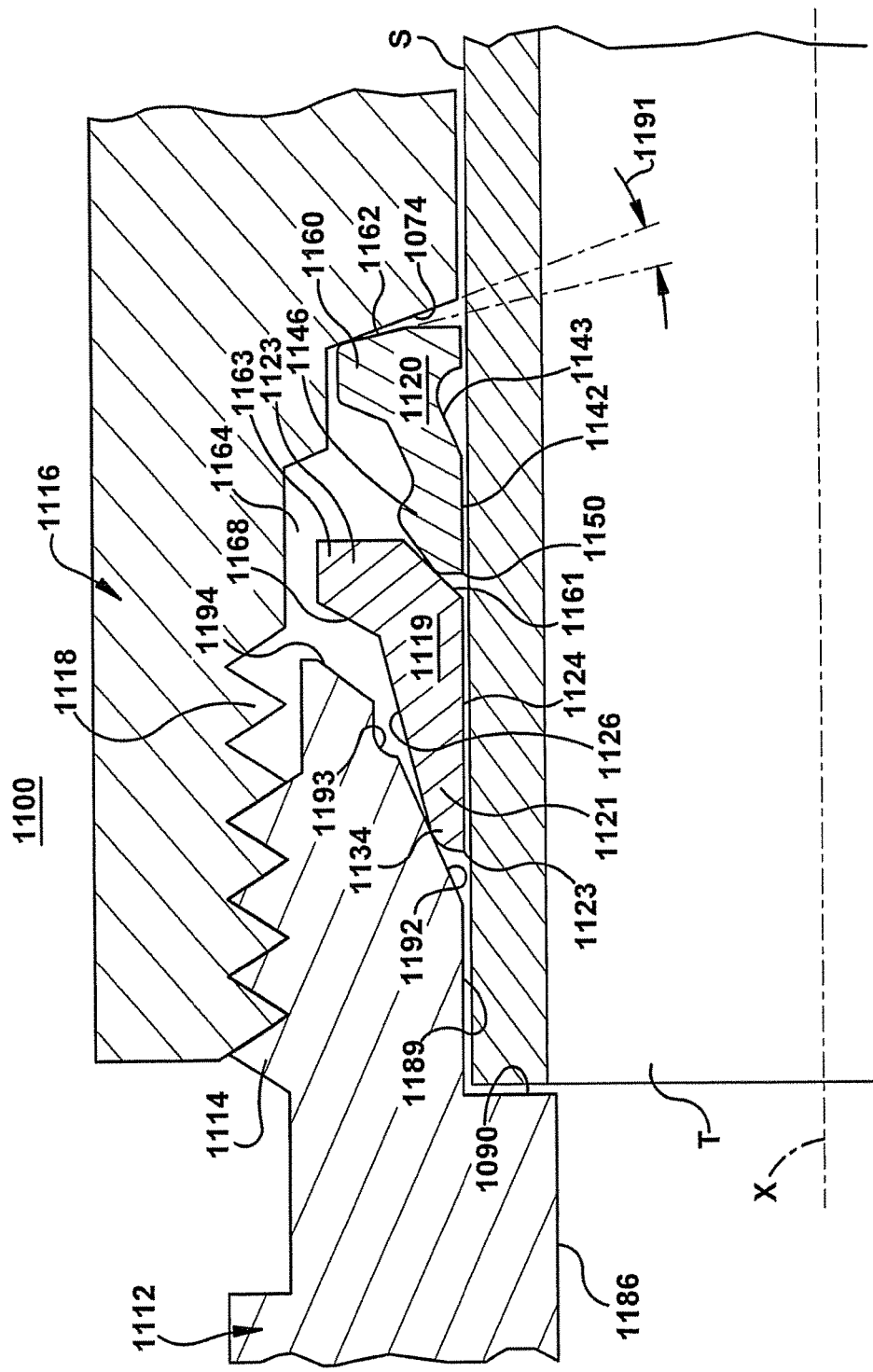
FIG. 11 is a longitudinal cross-section of an exemplary embodiment of a fitting with a front ferrule and a fitting body that are configured to facilitate pull-up by torque.

FIG. 11 illustrates another embodiment of a two ferrule fitting 1100 where a front ferrule is configured to engage a steep camming surface of a fitting component and thereby facilitate pull-up by torque. The fitting 1100 illustrated by FIG. 11 is a male-style fitting, but may also be configured as a female-style fitting. The fitting 1100 includes a nut 1116, a front ferrule 1119, a rear ferrule 1120 and a fitting body 1112. The fitting body 1112 includes a shallow tapered surface 1192 that cams a front portion of the front ferrule 1119 into engagement with the conduit end T and a steep tapered surface 1094 that engages a rear portion of the front ferrule 1120 to facilitate pull-up by torque. The male threaded body has external threads 1114. The male fitting body 1112 joins or connects with the female threaded nut 1116 having internal threads 1118. The nut 1116, the front ferrule 1119, and the rear ferrule 1120 fit onto a conduit end T that is assembled with the body 1112.

The nut 1116 has a frusto-conical portion 1074 that tapers radially inwardly towards a back end of the nut 1116. The frusto-conical portion 1174 forms a drive surface that contacts a driven surface 1162 of the rear ferrule 1120. A difference angle 1191 may be formed between the drive surface 1174 of the nut and the driven surface 1162 of the rear ferrule 1120.

The male threaded body 1112 is a generally cylindrical part centered on the axis X. The body 1112 is adapted to receive the conduit end T. A central bore 1186 extends through the body 1112 and forms a fluid flow path. The male body further includes a counterbore 1189 that forms a shoulder 1190. The conduit end T bottoms against the shoulder 1190 when received by the body 1112.

In the example illustrated by FIG. 11, the male fitting component 1112 further includes the shallow tapered surface, such as for example frusto-conical surface 1192 and the steep tapered surface, such as for example frusto-conical surface 1194. The shallow frusto-conical surface 1192 forms a ferrule camming surface in the body 1112 and may be axially adjacent the forward end of the counterbore 1189. The steep frusto-conical surface 1194 extends from the shallow surface toward the fitting body threads 1114. An optional recess 1193 may be included between the shallow tapered surface 1192 and the steep tapered surface 1194. In the example illustrated by FIG. 11, the shallow tapered surface 1192 is formed at an angle between ten degrees and thirty degrees with respect to the central axis X, but other angles may be used. The steep tapered surface 1194 is formed at an angle between thirty degrees and sixty degrees with respect to the central axis X, but other angles may be used.

The front ferrule 1119 is a generally annular part with a generally cylindrical interior wall 1124 that slips over the outer surface S of the conduit end T. The front ferrule 1119 includes a front portion 1121 and a rear portion 1123. The front portion 1121 has an outer surface 1126 that tapers outwardly in a generally conical manner to the rearward portion 1123. The front portion 1121 may include a sharp front edge 1132 and a rounded nose portion 1134. The rear portion 1123 includes a driven surface 1161 that extends radially inwardly at an angle. The rear portion 1123 also includes a radially extending flange 1163. The flange 1163 is sized to fit within a bore 1164 of the fitting body 1112. The flange 1163 includes a tapered surface 1168 at a forward portion of the flange. The tapered surface 1168 may extend at an angle between thirty degrees and sixty degrees, such as about forty-five degrees, with respect to the central axis X. The tapered surface 1168 engages the steep camming surface 1194 of the body 1112 during pull-up to provide a sharp torque rise that indicates that the fitting is properly pulled up.

The rear ferrule 1120 is a generally annular part with an interior wall 1142 that slips over the outer surface S of the conduit end T. The interior wall 1142 includes a notch 1143. The rear ferrule 1120 further includes a nose portion 1146 and a back end portion 1160. The nose portion 1146 includes a sharp front edge 1150. The back end portion 1160 has a driven surface 1162 that extends radially outwardly at an angle.

The front portion 1121 of the front ferrule 1119 is positioned partially within the camming mouth formed by the ferrule camming surface 1192. When the fitting is pulled up, the rear ferrule 1120 engages the drive surface 1174 and forces the front portion 1121 of the front ferrule 1127 into the camming mouth. The engagement of the front end of the front ferrule with the camming surface presses the front end of the front ferrule against the conduit surface S. The nose portion 1146 of the rear ferrule 1120 is plastically deformed so that the sharp edge 1150 bites or indents into the conduit surface S. The rear ferrule 1120 also drives the tapered surface 1168 of the front ferrule 1119 into contact with the steep camming surface 1194. The engagement between tapered surface 1168 of the front ferrule and the steep camming surface 1194 of the fitting body 1112 cause a torque required to further pull-up the fitting to sharply rise. This sharp rise in torque required to further pull-up the fitting provides an indication that the fitting is properly pulled up. Angling the steep camming surface 1194 and/or the surface 1168 of the ferrule that engages the steep camming surface to form an angle, for example an angle between thirty degrees and sixty degrees with respect to the central axis X allows the fitting to be remade.

The ferrules in the embodiments illustrated by FIGS. 8-11 may take a wide variety of different forms. The particular geometry and operation of the ferrules, or a single ferrule in such applications, may be selected as required for a particular application and dependent on the types of materials being used. Still further, the one or more components of the conduit gripping devices used in any of the embodiments disclosed by this application may be case hardened, for example by a low temperature carburization process to provide very hard conduit gripping devices that are corrosion resistant. The case hardening may be applied over a portion or all of the conduit gripping device component surface. A number of issued patents disclose such case hardening and geometry concepts that may be applied to the ferrules, such as U.S. Pat. Nos. 6,629,708; 6,547,888; 6,165,597; and U.S. Pat. No. 6,093,303 issued to the assignee of the present invention, the entire disclosures of which are fully incorporated herein by reference, as well as PCT International Publication Nos. WO 02/063195A2 and WO 02/063194A2 which are also incorporated herein by reference. Such patents and the concepts therein, however, are exemplary in nature as to the present invention and should not be construed in a limiting sense. Many different case hardening processes and a wide variety of geometric configurations may be used to properly control the plastic deformation of the conduit gripping device component(s) during pull-up to assure adequate seal and conduit grip.

Figure 12A:
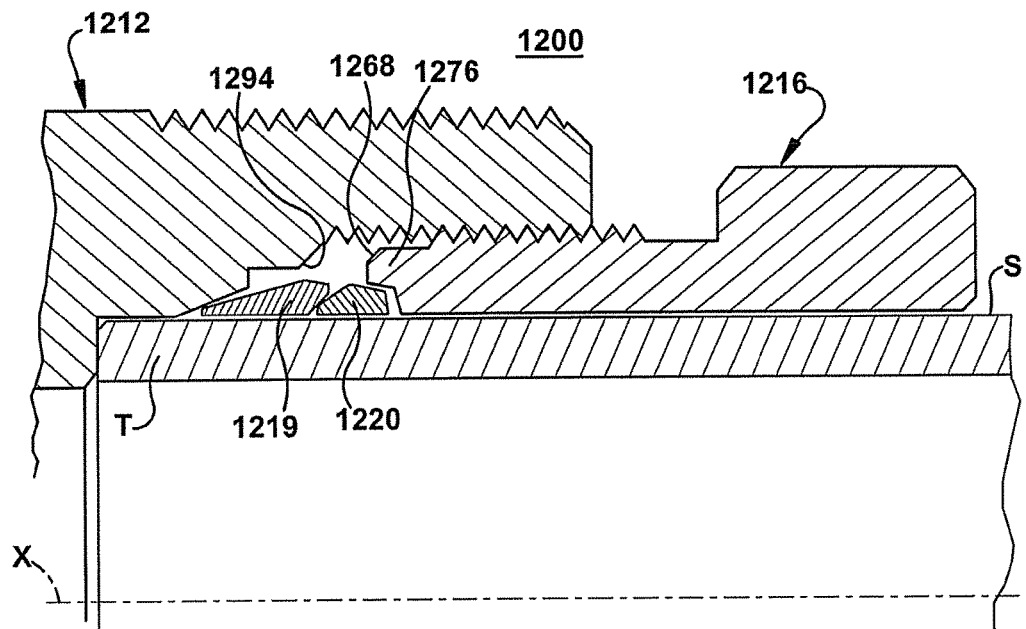
FIG. 12A is a longitudinal cross-section of an exemplary fitting with a male nut that provides a rear ferrule cartridge and facilitates pull-up by torque with the fitting in a finger tight condition.
Figure 12B:
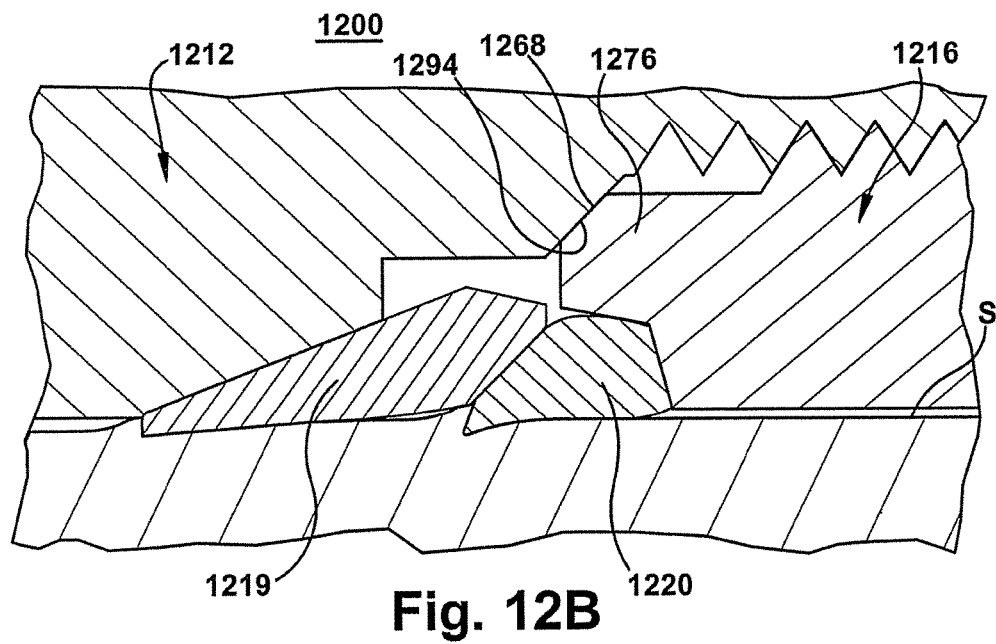
FIG. 12B is a longitudinal cross-section of an exemplary fitting with a male nut that provides a rear ferrule cartridge and facilitates pull-up by torque with the fitting in a pulled-up condition.

FIG. 12A illustrates a fitting 1200 that is a version of the fittings illustrated by FIGS. 4A and 4B where the cartridge 1276 is sized to surround a portion of a rear ferrule 1220, but does not extend around a front ferrule 1219. In the example illustrated by FIG. 12A, an inclined surface 1268 is disposed on the nut 1216 and an inclined surface 1294 is disposed on the fitting body 1212. However, pull-up by torque may be facilitated when an inclined surface is included on the nut and not the fitting body or when an inclined surface is included on the fitting body and not the nut. FIG. 12B illustrates the fitting 1200 in a pulled up condition. When the surface 1268 engages the surface 1294, the torque required to further pull up the fitting rises sharply to provide an indication that the fitting is properly pulled up. A description of how the ferrules of fitting 1200 are pulled up can be found in United States Patent Application Publication No.: 2005/0242582.

Figure 13A:
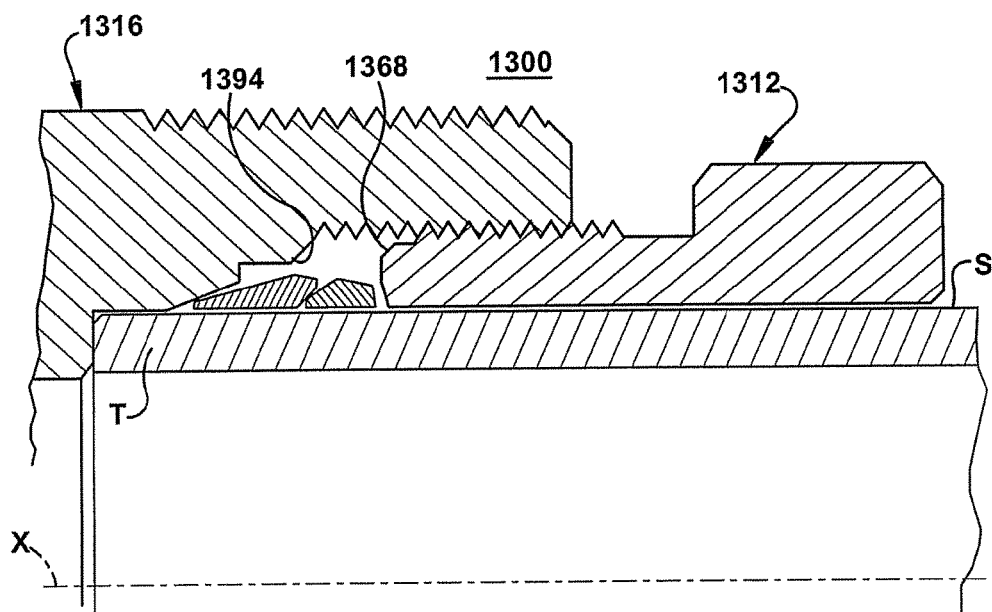
FIG. 13A is a longitudinal cross-section of an exemplary fitting with a cartridgeless male nut that facilitates pull-up by torque where the fitting is in a finger tight condition.
Figure 13B:
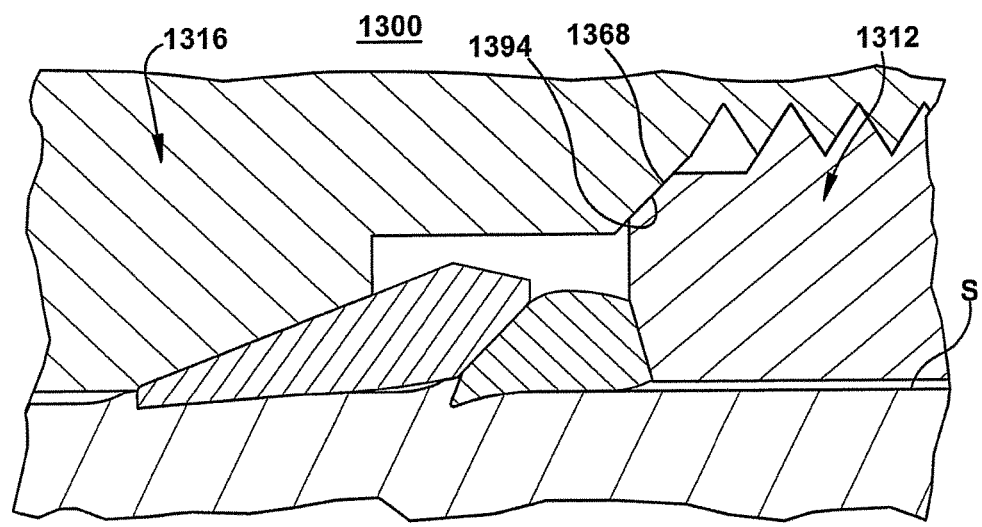
FIG. 13B is a longitudinal cross-section of an exemplary fitting with a cartridgeless male nut that facilitates pull-up by torque where the fitting is in a pulled-up condition.

FIG. 13A illustrates another fitting 1300 that is a version of the fittings illustrated by FIGS. 4A and 4B where no cartridge is included. In the example illustrated by FIG. 13A, an inclined surface 1368 is disposed on the nut 1312 and an inclined surface 1384 is disposed on the fitting body 1316. However, pull-up by torque may be facilitated when an inclined surface is included on the nut and not the fitting body or when an inclined surface is included on the fitting body and not the nut. FIG. 13B illustrates the fitting 1300 in a pulled up condition. When the surface 1368 engages the surface 1394, the torque required to further pull up the fitting rises sharply to provide an indication that the fitting is properly pulled up. A description of how the ferrules of fitting 1300 are pulled up can be found in United States Patent Application Publication No.: 2005/0242582.

Figure 14:
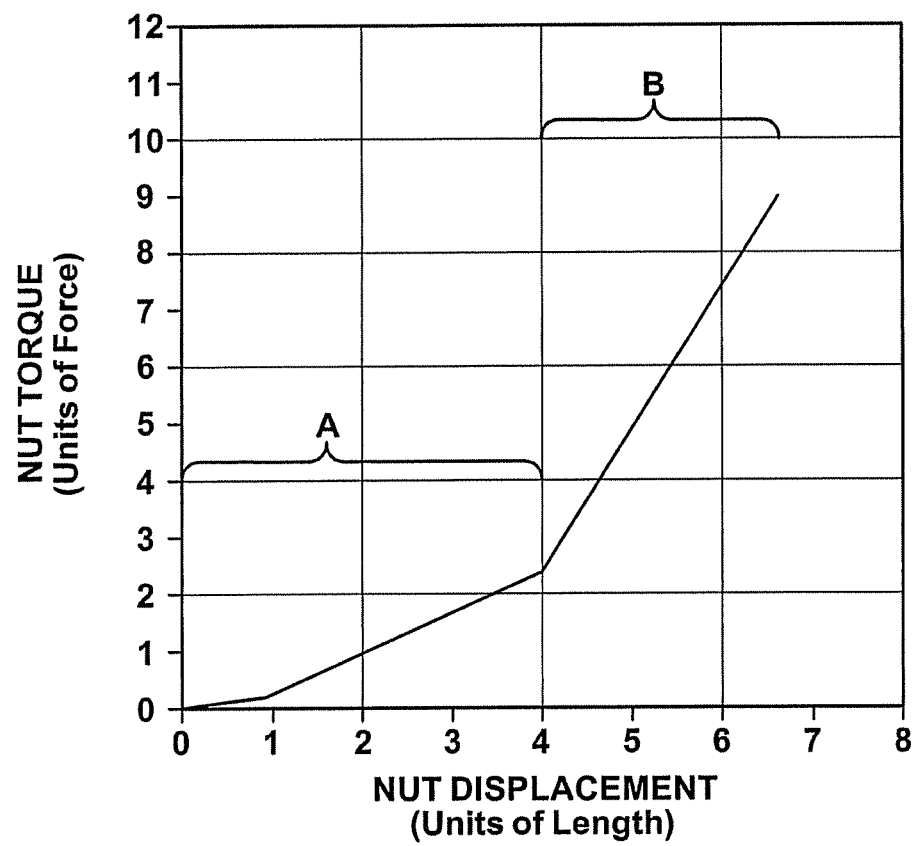
FIG. 14 is a graph that illustrates nut displacement versus nut torque for fittings that include a torque increasing mechanism.

In the embodiments described in this application, the assembler will also notice a sharp and dramatic increase in pull-up torque. FIG. 14 is a graph that illustrates a sharp increase in torque that may occur when one of the fittings described above is pulled up. Note that in region A the torque rises somewhat slowly and steadily as a result of the conduit gripping device plastically deforming while biting into the conduit T and camming against the body camming surface. When the relative positions of the fitting components cause one of the torque increasing arrangements disclosed above to act, however, the torque in region B increases sharply and dramatically. For example the rate at which the torque required to further pull-up the fitting may increase by a factor of two or more when one of the disclosed fittings are properly pulled up. By selecting an appropriate torque value that corresponds to proper pull-up, the fitting may be pulled-up by torque rather than by turns. Thus, a simple torque wrench may be used to make-up the fitting.

The invention has been described with reference to the preferred embodiments. Modification and alterations will occur to others upon a reading and understanding of this specification. It is intended to include all such modifications and alterations insofar as they come within the scope of the appended claims or the equivalents thereof.

The invention claimed is:

1. A conduit fitting comprising:
   a male threaded body defining a counterbore having a central axis and extending axially inward to a shoulder for receiving a conduit end;
   at least one conduit gripping device; and
   a female threaded nut adapted to be joined to said male threaded body to cause said at least one conduit gripping device to grip and seal when the conduit fitting is initially pulled-up on the conduit end, said female threaded nut comprising an engagement surface that is radially outward of female threads of said female threaded nut and that engages a contact surface of said male threaded body when the conduit fitting is pulled-up to a first relative axial position;
   wherein the engagement surface of the female threaded nut and the contact surface of the male threaded body are configured to provide a sharp increase in an amount of torque required to pull-up the fitting beyond the first relative axial position, while permitting the male threaded body to progress further into the female threaded nut, beyond the first relative axial position, with each remake of the fitting beyond the first relative axial position;
   wherein at least one of the contact surface of the male threaded body and the engagement surface of the female threaded nut comprises a tapered surface forming an angle of less than 90 degrees with respect to the central axis.

2. The conduit fitting of claim 1, wherein the contact surface of the male threaded body and the engagement surface of the female threaded nut are inclined at approximately the same angle.

3. The conduit fitting of claim 1, wherein the contact surface of the male threaded body and the engagement surface of the female threaded nut are each inclined at an angle of between 30 degrees and 60 degrees with respect to the central axis.

4. The conduit fitting of claim 1, wherein the male threaded body includes a recessed structure axially separated from the contact surface by an exterior surface.

5. The conduit fitting of claim 4, wherein the conduit fitting may be pulled-up to a relative axial position in which at least a portion of the recessed structure is covered by the nut.

6. The conduit fitting of claim 4, wherein at least a portion of the recessed structure is covered by the nut when the conduit fitting is pulled-up to the first relative axial position.

7. The conduit fitting of claim 1, wherein the first relative axial position corresponds to a relative axial position at which said at least one conduit gripping device is caused to grip and seal when the conduit fitting is initially pulled-up on the conduit end.

8. The conduit fitting of claim 1, wherein said male threaded body, said female threaded nut, and said at least one conduit gripping device comprise stainless steel and produce grip and seal of a stainless steel conduit when the conduit fitting is pulled up.

9. The conduit fitting of claim 1 wherein said at least one conduit gripping device comprises a single ferrule.

* * * * *